(12) United States Patent
Seo et al.

(10) Patent No.: US 10,742,971 B2
(45) Date of Patent: Aug. 11, 2020

(54) INTER PREDICTION METHOD AND DEVICE THAT PERFORMS PREDICTION BY APPLYING WEIGHTS TO MOTION INFORMATION OF A CURRENT BLOCK

(71) Applicant: LG ELECTRONICS INC., Seoul (KR)

(72) Inventors: Jungdong Seo, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/339,635

(22) PCT Filed: Jul. 10, 2017

(86) PCT No.: PCT/KR2017/007361
§ 371 (c)(1),
(2) Date: Apr. 4, 2019

(87) PCT Pub. No.: WO2018/066791
PCT Pub. Date: Apr. 12, 2018

(65) Prior Publication Data
US 2020/0107015 A1    Apr. 2, 2020

Related U.S. Application Data

(60) Provisional application No. 62/404,744, filed on Oct. 5, 2016.

(51) Int. Cl.
*H04N 19/176* (2014.01)
*H04N 7/24* (2011.01)
(Continued)

(52) U.S. Cl.
CPC ......... *H04N 19/105* (2014.11); *H04N 19/139* (2014.11); *H04N 19/172* (2014.11); *H04N 19/176* (2014.11); *H04N 19/573* (2014.11)

(58) Field of Classification Search
CPC .. H04N 19/105; H04N 19/172; H04N 19/139; H04N 19/573; H04N 19/176
(Continued)

(56) References Cited

U.S. PATENT DOCUMENTS 9,762,908 B2 * 9/2017 Kim .................. H04N 19/105
10,368,084 B2 * 7/2019 Lee .................... H04N 19/52
(Continued)

FOREIGN PATENT DOCUMENTS

KR    10-2013-0085393 A    7/2013
KR    10-2014-0120887 A    10/2014
(Continued)

*Primary Examiner* — Susan E. Hodges
(74) *Attorney, Agent, or Firm* — Dentons US LLP

(57) ABSTRACT

A method for decoding an image by a decoding apparatus according to the present invention comprises the steps of: deriving first motion information of a current block in a first direction and second motion information of the current block in a second direction; deriving a first reference sample on the basis of the first motion information; deriving a second reference sample on the basis of the second motion information; deriving a first weight for the first reference sample and a second weight for the second reference sample; and generating a prediction sample of the current block by performing a weighted summation of the first and second reference samples on the basis of the first and second weights, wherein the first motion information comprises a first reference picture index and a first MV and the second motion information comprises a second reference picture index and a second MV.

8 Claims, 11 Drawing Sheets

(51) Int. Cl.
*H04N 19/105* (2014.01)
*H04N 19/172* (2014.01)
*H04N 19/573* (2014.01)
*H04N 19/139* (2014.01)

(58) Field of Classification Search
USPC .......................................................... 375/240
See application file for complete search history.

(56) References Cited

U.S. PATENT DOCUMENTS

2014/0133560 A1* 5/2014 Kim ..................... H04N 19/52
375/240.12
2014/0355898 A1* 12/2014 Cherigui ................ H04N 19/52
382/233

FOREIGN PATENT DOCUMENTS

| KR | 10-2015-0066636 A | 6/2015 |
| KR | 10-2016-0063995 A | 6/2016 |
| KR | 10-2016-0072836 A | 6/2016 |

* cited by examiner

First reference picture      Second reference picture

FIG. 8
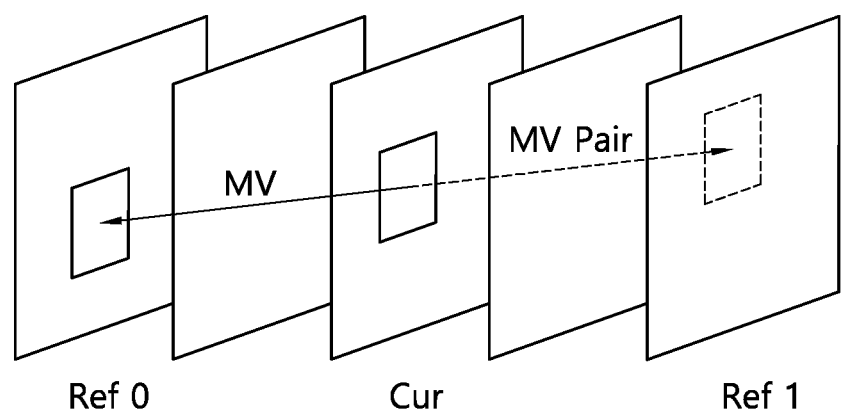
(a)
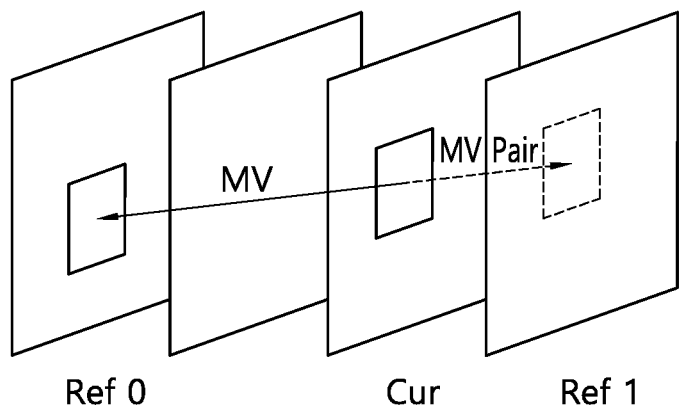
(b)

INTER PREDICTION METHOD AND DEVICE THAT PERFORMS PREDICTION BY APPLYING WEIGHTS TO MOTION INFORMATION OF A CURRENT BLOCK

CROSS-REFERENCE TO RELATED APPLICATIONS

This application is the National Stage filing under 35 U.S.C. 371 of International Application No. PCT/KR2017/007361, filed on Jul. 10, 2017, which claims the benefit of U.S. Provisional Application No. 62/404,744 filed on Oct. 5, 2016, the contents of which are all hereby incorporated by reference herein in their entirety.

BACKGROUND OF THE INVENTION

Field of the Invention

The present disclosure relates to video coding techniques, and more particularly to video decoding methods and devices in video coding systems.

Related Art

Demand for high-resolution, high-quality images such as HD (High Definition) images and UHD (Ultra High Definition) images have been increasing in various fields. As the image data has high resolution and high quality, the amount of information or bits to be transmitted increases relative to the legacy image data. Therefore, when image data is transmitted using a medium such as a conventional wired/wireless broadband line or image data is stored using an existing storage medium, the transmission cost and the storage cost thereof are increased.

Accordingly, there is a need for a highly efficient image compression technique for effectively transmitting, storing, and reproducing information of high resolution and high quality images.

SUMMARY OF THE INVENTION

One technical purpose of the present disclosure is to provide a method and device for improving video coding efficiency.

Another technical purpose of the present disclosure is to provide an inter prediction method and device that performs prediction by applying weights to L0 motion information and L1 motion information of a current block respectively.

Still another technical purpose of the present disclosure is to provide a method and device for deriving L0 motion information and L1 motion information about a current block.

Still another technical purpose of the present disclosure is to provide a method and device for deriving weights for L0 motion information and L1 motion information about a current block.

In one aspect of the present disclosure, there is provided a video decoding method performed by a decoding device, the method comprising: deriving first motion information and second motion information for a current block; deriving a first reference sample based on the first motion information; deriving a second reference sample based on the second motion information; deriving a first weight for the first reference sample and a second weight for the second reference sample; and performing a weighted-sum of the first reference sample and the second reference sample based on the first weight and the second weight, thereby generating a predicted sample of the current block, wherein the first motion information includes a first reference picture index and a first motion vector (MV), wherein the second motion information includes a second reference picture index and a second MV.

In another aspect of the present disclosure, there is provided a video decoding device, the device comprising: a prediction module for deriving first motion information and second motion information for a current block; deriving a first reference sample based on the first motion information; deriving a second reference sample based on the second motion information; deriving a first weight for the first reference sample and a second weight for the second reference sample; and performing a weighted-sum of the first reference sample and the second reference sample based on the first weight and the second weight, thereby generating a predicted sample of the current block; and a memory for storing at least one reference picture, wherein the first motion information includes a first reference picture index and a first motion vector (MV), wherein the second motion information includes a second reference picture index and a second MV.

In another aspect of the present disclosure, there is provided a video encoding method performed by an encoding device, the method comprising: deriving first motion information and second motion information for a current block; deriving a first reference sample based on the first motion information; deriving a second reference sample based on the second motion information; deriving a first weight for the first reference sample and a second weight for the second reference sample; and performing a weighted-sum of the first reference sample and the second reference sample based on the first weight and the second weight, thereby generating a predicted sample of the current block, wherein the first motion information includes a first reference picture index and a first motion vector (MV), wherein the second motion information includes a second reference picture index and a second MV.

In still another aspect of the present disclosure, there is provided a video encoding device, the device comprising: a prediction module for deriving first motion information and second motion information for a current block; deriving a first reference sample based on the first motion information; deriving a second reference sample based on the second motion information; deriving a first weight for the first reference sample and a second weight for the second reference sample; and performing a weighted-sum of the first reference sample and the second reference sample based on the first weight and the second weight, thereby generating a predicted sample of the current block; and a memory for storing at least one reference picture, wherein the first motion information includes a first reference picture index and a first motion vector (MV), wherein the second motion information includes a second reference picture index and a second MV.

According to the present disclosure, inter-prediction may be performed by applying respective weights to first motion information and second motion information about a current block. This may improve the prediction accuracy of the current block.

According to the present disclosure, the amount of additional information for the first motion information and the second motion information about the current block may be reduced. This may improve overall coding efficiency.

According to the present disclosure, the amount of additional information for weights for the first motion information and the second motion information about the current block may be reduced. This may improve overall coding efficiency.

BRIEF DESCRIPTION OF THE DRAWINGS

FIG. 8 shows one example of a method for deriving the weights based on the POC difference between the reference pictures and the current picture.

DESCRIPTION OF EXEMPLARY EMBODIMENTS

Figure 1:
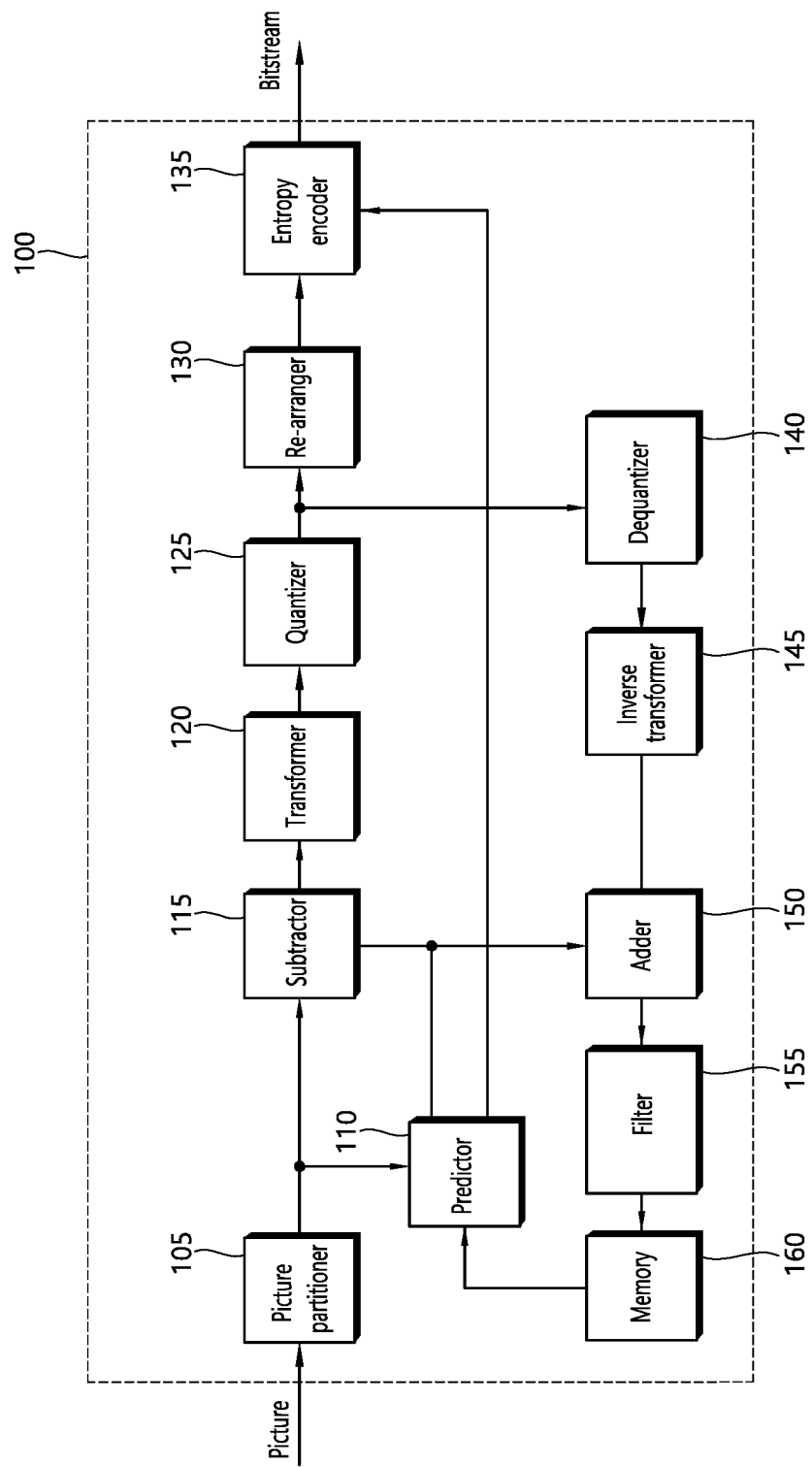
FIG. 1 is a schematic diagram illustrating a configuration of a video encoding device to which the present disclosure is applicable.

The present disclosure may be modified in various forms, and specific embodiments thereof will be described and illustrated in the drawings. However, the embodiments are not intended for limiting the disclosure. The terms used in the following description are used to merely describe specific embodiments, but are not intended to limit the disclosure. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the disclosure are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the disclosure without departing from the concept of the disclosure.

Hereinafter, embodiments of the present disclosure will be described in detail with reference to the accompanying drawings. In addition, like reference numerals are used to indicate like elements throughout the drawings, and the same descriptions on the like elements will be omitted.

In the present specification, generally a picture means a unit representing an image at a specific time, a slice is a unit constituting a part of the picture. One picture may be composed of plural slices, and the terms of a picture and a slice may be mixed with each other as occasion demands.

A pixel or a pel may mean a minimum unit constituting one picture (or image). Further, a "sample" may be used as a term corresponding to a pixel. The sample may generally represent a pixel or a value of a pixel, may represent only a pixel (a pixel value) of a luma component, and may represent only a pixel (a pixel value) of a chroma component.

A unit indicates a basic unit of image processing. The unit may include at least one of a specific area and information related to the area. Optionally, the unit may be mixed with terms such as a block, an area, or the like. In a typical case, an M×N block may represent a set of samples or transform coefficients arranged in M columns and N rows.

FIG. 1 briefly illustrates a structure of a video encoding device to which the present disclosure is applicable.

Referring to FIG. 1, a video encoding device 100 includes a picture partitioner 105, a predictor 110, a subtractor 115, a transformer 120, a quantizer 125, a re-arranger 130, an entropy encoder 135, a dequantizer 140, an inverse transformer 145, an adder 150, a filter 255, and a memory 160.

The picture partitioner 105 may split an input picture into at least one processing unit. Here, a processing unit may be a coding unit (CU), a prediction unit (PU) or a transform unit (TU). The coding unit is a unit block of coding, and a largest coding unit (LCU) may be split into coding units of deeper depth according to a quad-tree structure. In this case, the largest coding unit may be used as a final coding unit or a coding unit may be recursively split into coding units of deeper depth as necessary and a coding unit having an optimal size may be used as a final coding unit based on coding efficiency according to video characteristics. When a smallest coding unit (SCU) is set, a coding unit cannot be split into a coding unit smaller than the smallest coding unit. Here, the final coding unit refers to a coding unit partitioned or split into a predictor or a transformer. A prediction unit is a block partitioned from a coding unit block and may be a unit block of sample prediction. Here, the prediction unit may be divided into sub blocks. A transform block can be split from a coding unit block according to the quad-tree structure and may be a unit block that derives a transform coefficient and/or a unit block that derives a residual signal from a transform coefficient.

Hereinafter, the coding unit may be called a coding block (CB), the prediction unit may be called a prediction block (PB), and the transform unit may be called a transform block (TB).

The prediction block or the prediction unit may mean a specific area having a block shape in a picture, and may include an array of a prediction sample. Further, the transform block or the transform unit may mean a specific area having a block shape in a picture, and may include a transform coefficient or an array of residual samples.

In one example, the current picture may be divided according to a quad-tree binary-tree (QTBT) structure. In this case, a coding unit, prediction unit, transform unit may be used in an integrated manner without discrimination therebetween. In this case, an integrated unit may be called a coding unit. In this case, a final coding unit may be square or non-square.

The predictor 110 may perform prediction on a processing target block (hereinafter, a current block), and may generate a prediction block including prediction samples for the current block. A unit of prediction performed in the predictor 110 may be a coding block, or may be a transform block, or may be a prediction block.

The predictor 110 may determine whether intra-prediction is applied or inter-prediction is applied to the current block. For example, the predictor 110 may determine whether the intra-prediction or the inter-prediction is applied in unit of CU.

In case of the intra-prediction, the predictor 110 may derive a prediction sample for the current block based on a reference sample outside the current block in a picture to which the current block belongs (hereinafter, a current picture). In this case, the predictor 110 may derive the prediction sample based on an average or interpolation of neighboring reference samples of the current block (case (i)), or may derive the prediction sample based on a reference sample existing in a specific (prediction) direction as to a prediction sample among the neighboring reference samples of the current block (case (ii)). The case (i) may be called a non-directional mode or a non-angular mode, and the case (ii) may be called a directional mode or an angular mode. In the intra-prediction, prediction modes may include as an example 33 directional modes and at least two non-directional modes. The non-directional modes may include DC mode and planar mode. The predictor 110 may determine the prediction mode to be applied to the current block by using the prediction mode applied to the neighboring block.

In case of the inter-prediction, the predictor 110 may derive the prediction sample for the current block based on a sample specified by a motion vector on a reference picture. The predictor 110 may derive the prediction sample for the current block by applying any one of a skip mode, a merge mode, and a motion vector prediction (MVP) mode. In case of the skip mode and the merge mode, the predictor 110 may use motion information of the neighboring block as motion information of the current block. In case of the skip mode, unlike in the merge mode, a difference (residual) between the prediction sample and an original sample is not transmitted. In case of the MVP mode, a motion vector of the neighboring block is used as a motion vector predictor and thus is used as a motion vector predictor of the current block to derive a motion vector of the current block.

In case of the inter-prediction, the neighboring block may include a spatial neighboring block existing in the current picture and a temporal neighboring block existing in the reference picture. The reference picture including the temporal neighboring block may also be called a collocated picture (colPic). Motion information may include the motion vector and a reference picture index. Information such as prediction mode information and motion information may be (entropy) encoded, and then output as a form of a bitstream.

When motion information of a temporal neighboring block is used in the skip mode and the merge mode, a highest picture in a reference picture list may be used as a reference picture. Reference pictures included in the reference picture list may be aligned based on a picture order count (POC) difference between a current picture and a corresponding reference picture. A POC corresponds to a display order and can be discriminated from a coding order.

The subtractor 115 generates a residual sample which is a difference between an original sample and a prediction sample. when the skip mode is applied, the residual sample may not be generated as described above.

The transformer 120 transforms residual samples in units of a transform block to generate a transform coefficient. The transformer 120 may perform transformation based on the size of a corresponding transform block and a prediction mode applied to a coding block or prediction block spatially overlapping with the transform block. For example, residual samples can be transformed using discrete sine transform (DST) when intra-prediction is applied to the coding block or the prediction block overlapping with the transform block and the transform block is a 4×4 residual array and is transformed using discrete cosine transform (DCT) in other cases.

The quantizer 125 may quantize the transform coefficients to generate a quantized transform coefficient.

The re-arranger 130 rearranges quantized transform coefficients. The re-arranger 130 may rearrange the quantized transform coefficients in the form of a block into a one-dimensional vector through a coefficient scanning method. Although the re-arranger 130 is described as a separate component, the re-arranger 130 may be a part of the quantizer 125.

The entropy encoder 135 may perform entropy-encoding on the quantized transform coefficients. The entropy encoding may include an encoding method, for example, an exponential Golomb, a context-adaptive variable length coding (CAVLC), a context-adaptive binary arithmetic coding (CABAC), or the like. The entropy encoder 135 may perform encoding together or separately on information (e.g., a syntax element value or the like) required for video reconstruction in addition to the quantized transform coefficients. The entropy-encoded information may be transmitted or stored in unit of a network abstraction layer (NAL) in a bitstream form.

The dequantizer 140 dequantizes values (transform coefficients) quantized by the quantizer 125 and the inverse transformer 145 inversely transforms values dequantized by the dequantizer 135 to generate a residual sample.

The adder 150 adds a residual sample to a prediction sample to reconstruct a picture. The residual sample may be added to the prediction sample in units of a block to generate a reconstructed block. Although the adder 150 is described as a separate component, the adder 150 may be a part of the predictor 110.

The filter 155 may apply deblocking filtering and/or a sample adaptive offset to the reconstructed picture. Artifacts at a block boundary in the reconstructed picture or distortion in quantization can be corrected through deblocking filtering and/or sample adaptive offset. Sample adaptive offset may be applied in units of a sample after deblocking filtering is completed. The filter 155 may apply an adaptive loop filter (ALF) to the reconstructed picture. The ALF may be applied to the reconstructed picture to which deblocking filtering and/or sample adaptive offset has been applied.

The memory 160 may store a reconstructed picture or information necessary for encoding/decoding. Here, the reconstructed picture may be the reconstructed picture filtered by the filter 155. The stored reconstructed picture may be used as a reference picture for (inter) prediction of other pictures. For example, the memory 160 may store (reference) pictures used for inter-prediction. Here, pictures used for inter-prediction may be designated according to a reference picture set or a reference picture list.

Figure 2:
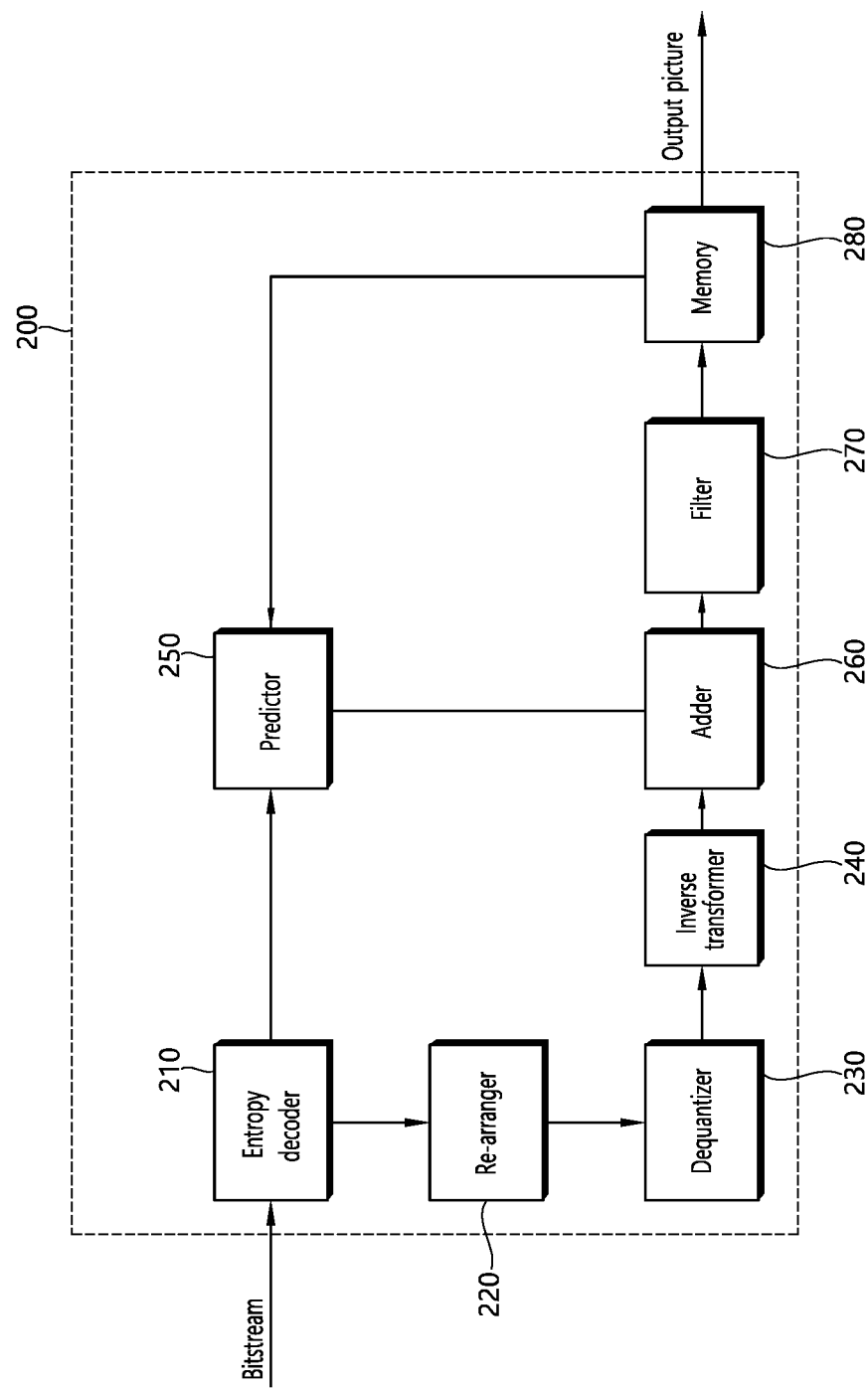
FIG. 2 is a schematic diagram illustrating a configuration of a video decoding device to which the present disclosure is applicable.

FIG. 2 briefly illustrates a structure of a video decoding device to which the present disclosure is applicable.

Referring to FIG. 2, a video decoding device 200 includes an entropy decoder 210, a re-arranger 220, a dequantizer 230, an inverse transformer 240, a predictor 250, an adder 260, a filter 270, and a memory 280.

When a bitstream including video information is input, the video decoding device 200 may reconstruct a video in association with a process by which video information is processed in the video encoding device.

For example, the video decoding device 200 may perform video decoding by using a processing unit applied in the video encoding device. Therefore, the processing unit block of video decoding may be a coding unit block, a prediction unit block, or a transform unit block. As a unit block of decoding, the coding unit block may be split according to a quad tree structure from a largest coding unit block. As a block partitioned from the coding unit block, the prediction unit block may be a unit block of sample prediction. In this case, the prediction unit block may be divided into sub blocks. As a coding unit block, the transform unit block may be split according to the quad tree structure, and may be a unit block for deriving a transform coefficient or a unit block for deriving a residual signal from the transform coefficient.

The entropy decoder 210 may parse the bitstream to output information required for video reconstruction or picture reconstruction. For example, the entropy decoder 210 may decode information in the bitstream based on a coding method such as exponential Golomb encoding, CAVLC, CABAC, or the like, and may output a value of a syntax element required for video reconstruction and a quantized value of a transform coefficient regarding a residual.

More specifically, a CABAC entropy decoding method can receive a bin corresponding to each syntax element in a bitstream, determine a context model using decoding target syntax element information and decoding information of neighboring and decoding target blocks or information of amabol/bin decoded in a previous step, predict bin generation probability according to the determined context model and perform arithmetic decoding of the bin to generate a symbol corresponding to each syntax element value. Here, the CABAC entropy decoding method can update the context model using information of a symbol/bin decoded for a context model of the next symbol/bin after determination of the context model.

Information about prediction among information decoded in the entropy decoder 210 may be provided to the predictor 250 and residual values, that is, quantized transform coefficients, on which entropy decoding has been performed by the entropy decoder 210 may be input to the re-arranger 220.

The re-arranger 220 may rearrange the quantized transform coefficients into a two-dimensional block form. The re-arranger 220 may perform rearrangement corresponding to coefficient scanning performed by the encoding device. Although the re-arranger 220 is described as a separate component, the re-arranger 220 may be a part of the quantizer 230.

The dequantizer 230 may de-quantize the quantized transform coefficients based on a (de)quantization parameter to output a transform coefficient. In this case, information for deriving a quantization parameter may be signaled from the encoding device.

The inverse transformer 240 may inverse-transform the transform coefficients to derive residual samples.

The predictor 250 may perform prediction on a current block, and may generate a prediction block including prediction samples for the current block. A unit of prediction performed in the predictor 250 may be a coding block or may be a transform block or may be a prediction block.

The predictor 250 may determine whether to apply intra-prediction or inter-prediction based on information on a prediction. In this case, a unit for determining which one will be used between the intra-prediction and the inter-prediction may be different from a unit for generating a prediction sample. In addition, a unit for generating the prediction sample may also be different in the inter-prediction and the intra-prediction. For example, which one will be applied between the inter-prediction and the intra-prediction may be determined in unit of CU. Further, for example, in the inter-prediction, the prediction sample may be generated by determining the prediction mode in unit of PU, and in the intra-prediction, the prediction sample may be generated in unit of TU by determining the prediction mode in unit of PU.

In case of the intra-prediction, the predictor 250 may derive a prediction sample for a current block based on a neighboring reference sample in a current picture. The predictor 250 may derive the prediction sample for the current block by applying a directional mode or a non-directional mode based on the neighboring reference sample of the current block. In this case, a prediction mode to be applied to the current block may be determined by using an intra-prediction mode of a neighboring block.

In the case of inter-prediction, the predictor 250 may derive a prediction sample for a current block based on a sample specified in a reference picture according to a motion vector. The predictor 250 may derive the prediction sample for the current block using one of the skip mode, the merge mode and the MVP mode. Here, motion information required for inter-prediction of the current block provided by the video encoding device, for example, a motion vector and information about a reference picture index may be acquired or derived based on the information about prediction.

In the skip mode and the merge mode, motion information of a neighboring block may be used as motion information of the current block. Here, the neighboring block may include a spatial neighboring block and a temporal neighboring block.

The predictor 250 may construct a merge candidate list using motion information of available neighboring blocks and use information indicated by a merge index on the merge candidate list as a motion vector of the current block. The merge index may be signaled by the encoding device. Motion information may include a motion vector and a reference picture. When motion information of a temporal neighboring block is used in the skip mode and the merge mode, a highest picture in a reference picture list may be used as a reference picture.

In the case of the skip mode, a difference (residual) between a prediction sample and an original sample is not transmitted, distinguished from the merge mode.

In the case of the MVP mode, the motion vector of the current block may be derived using a motion vector of a neighboring block as a motion vector predictor. Here, the neighboring block may include a spatial neighboring block and a temporal neighboring block.

When the merge mode is applied, for example, a merge candidate list can be generated using a motion vector of a reconstructed spatial neighboring block and/or a motion vector corresponding to a Col block which is a temporal neighboring block. A motion vector of a candidate block selected from the merge candidate list is used as the motion vector of the current block in the merge mode. The aforementioned information about prediction may include a merge index indicating a candidate block having the best motion vector selected from candidate blocks included in the merge candidate list. Here, the predictor 250 may derive the motion vector of the current block using the merge index.

When the MVP (Motion vector Prediction) mode is applied as another example, a motion vector predictor candidate list may be generated using a motion vector of a reconstructed spatial neighboring block and/or a motion vector corresponding to a Col block which is a temporal neighboring block. That is, the motion vector of the reconstructed spatial neighboring block and/or the motion vector corresponding to the Col block which is the temporal neighboring block may be used as motion vector candidates. The aforementioned information about prediction may include a prediction motion vector index indicating the best motion vector selected from motion vector candidates included in the list. Here, the predictor 250 may select a prediction motion vector of the current block from the motion vector candidates included in the motion vector candidate list using the motion vector index. The predictor of the encoding device may obtain a motion vector difference (MVD) between the motion vector of the current block and a motion vector predictor, encode the MVD and output the encoded MVD in the form of a bitstream. That is, the MVD can be obtained by subtracting the motion vector predictor from the motion vector of the current block. Here, the predictor 250 may acquire a motion vector included in the information about prediction and derive the motion vector of the current block by adding the motion vector difference to the motion vector predictor. In addition, the predictor may obtain or derive a reference picture index indicating a reference picture from the aforementioned information about prediction.

The adder 260 can add a residual sample to a prediction sample to reconstruct a current block or a current picture. The adder 260 may reconstruct the current picture by adding the residual sample to the prediction sample in units of a block. When the skip mode is applied, a residual is not transmitted and thus the prediction sample may become a reconstructed sample. Although the adder 260 is described as a separate component, the adder 260 may be a part of the predictor 250.

The filter 270 may apply deblocking filtering, sample adaptive offset and/or ALF to the reconstructed picture. Here, sample adaptive offset may be applied in units of a sample after deblocking filtering. The ALF may be applied after deblocking filtering and/or application of sample adaptive offset.

The memory 280 may store a reconstructed picture or information necessary for decoding. Here, the reconstructed picture may be the reconstructed picture filtered by the filter 270. For example, the memory 280 may store pictures used for inter-prediction. Here, the pictures used for inter-prediction may be designated according to a reference picture set or a reference picture list. A reconstructed picture may be used as a reference picture for other pictures. The memory 280 may output reconstructed pictures in an output order.

If inter-prediction is performed on the current block as described above, motion information for the inter-prediction may be derived. The motion information may include first motion information for the first direction and/or second motion information for the second direction. In this connection, the first motion information may include a first reference picture index and a first motion vector (MV) included in the first reference picture list for the current block. The second motion information may include a second reference picture index and second MV included in the second reference picture list for the current block. In this connection, the first direction may be called L0 direction, or past direction, or forward direction. Further, the second direction may be referred to as the L1 direction, or future direction, or reverse direction. Further, the first motion information may be referred to as L0 motion information, while the second motion information may also be referred to as L1 motion information. Further, the first MV may be called MVL0, while the second MV may be called MVL1. Further, the first reference picture list may be referred to as a reference picture list L0 (List 0, L0). The second reference picture list may be referred to as a reference picture list L1 (List 1, L1). Further, the first reference picture index may indicate the first reference picture on the first reference picture list, while the second reference picture may indicate the second reference picture on the second reference picture list. The first reference picture list may include previous pictures to the current picture in the output order while the second reference picture list may include subsequent pictures to the current picture in the output order.

Figure 3:
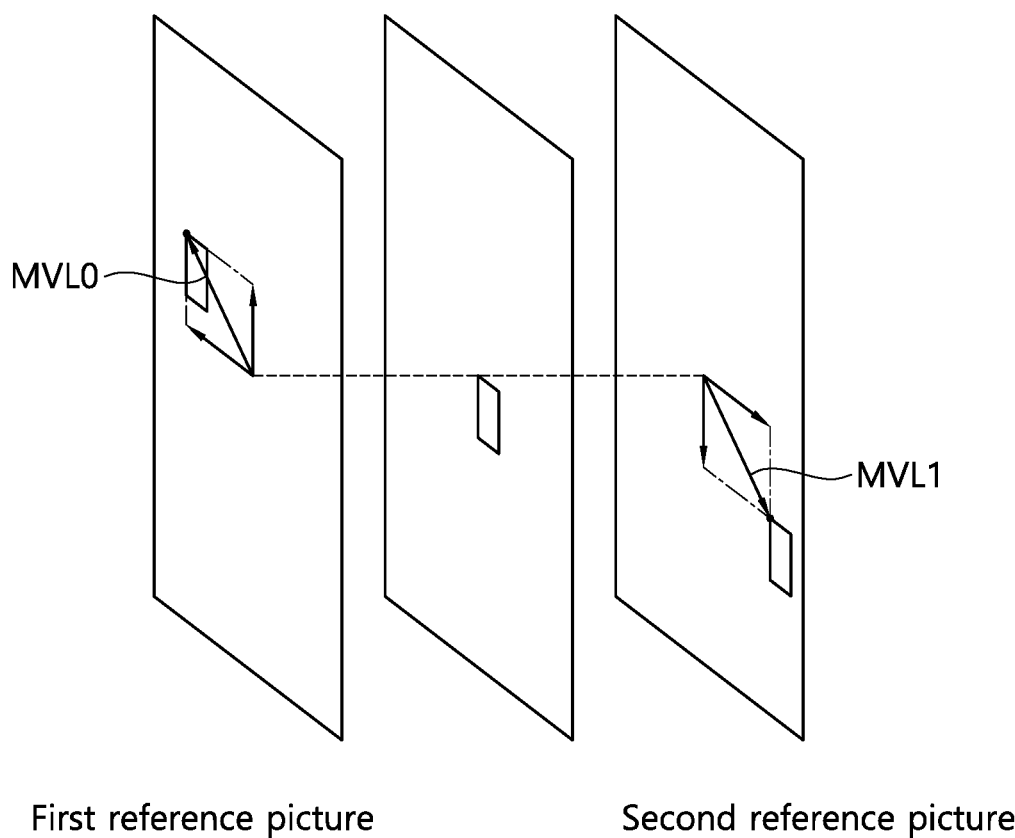
FIG. 3 shows the first reference picture and the second reference picture and MVL0 and MVL1 for inter-prediction of the current block.

FIG. 3 shows the first reference picture and the second reference picture and MVL0 and MVL1 for inter-prediction of the current block. When inter-prediction based on L0 motion information is performed in prediction of the current block, this may be referred to as L0 prediction. When performing inter-prediction based on L1 motion information in prediction of a current block, this may be referred to as L1 prediction. When inter-prediction is performed based on the L0 motion information and L1 motion information in prediction of the current block, this may be called bi-prediction.

In one example, in accordance with the present disclosure, we proposes a method to derive a predicted sample of the current block using the weighted-sum of the first reference sample derived from the L0 motion information and the second reference sample derived from the L1 motion information when inter-prediction is performed on the current block, in particular, when bi-prediction is performed on the current block. Further, we propose a method by which the L0 motion information and L1 motion information are derived without transmitting additional information, and weights for the weighted-summing of the first reference sample and the second reference sample are derived. The motion information for the inter-prediction may be derived by signaling additional information related to the motion information and deriving the motion information based on the additional information. Alternatively, the transmission of the additional information may be eliminated or minimized. The motion information for the inter-prediction may be derived using motion estimation in a decoding device. A method for deriving motion information for the inter-prediction using the motion estimation may be referred to as a decoder side motion information derivation. This may be used to improve the accuracy of inter-prediction. Further, the amount of data corresponding to the transmission of the additional information for the inter-prediction may be reduced or eliminated, which may improve overall coding efficiency.

In one example, when the motion information is derived using the decoder side motion information derivation technique, the decoding device may derive motion information in a similar manner to the encoding device. Therefore, the transmission of additional information for the motion information may be omitted, thereby obtaining a gain in terms of bit rate. However, since the decoding device does not have information on the reconstructed sample of the current block, the cost function-based method and other methods commonly used in the motion information search by the encoding device may be used for searching the motion information. Specifically, the following two methods, that is, the bi-lateral matching method or template matching method, may be used.

Figure 4:
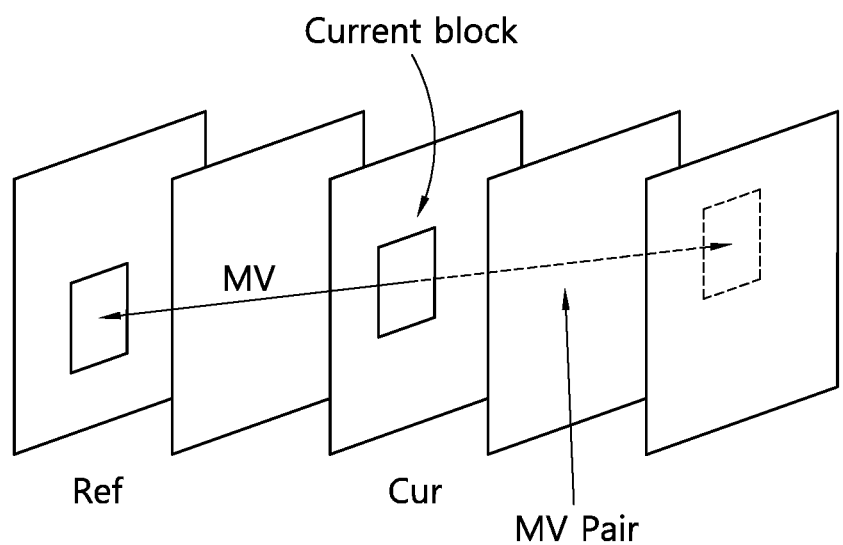
FIG. 4 shows an example of a method for deriving the motion information of the current block using the Bi-lateral matching method.

FIG. 4 shows an example of a method for deriving the motion information of the current block using the Bi-lateral matching method. In one example, in FIG. 4, the MV (and MV Pair) is schematically shown in a space for convenience of illustration. However, it is obvious to those skilled in the art that the MV (MV pair) substantially represents a vector between a current block position and a reference block position on a reference picture.

The Bi-lateral matching method may be called a symmetric motion information derivation method. In the bi-lateral matching method, for example, it may be assumed that the sample value representing the object in the video does not change over time and the object moves at a constant speed within a short time. That is, since the sample values representing the object are the same between the adjacent pictures, and the motion speed of the object is constant, motion information of the current block may be represented as shown in FIG. 4. Specifically, for example, there may be the first motion information for the current block, and the reference block may be derived based on the first motion information. The reference block may be called the first reference block or may be called the L0 reference block. In this case, because the motion of the object is constant, there may be another reference block corresponding to the first reference block at a position symmetric thereto in the L1 direction around the position of the current block. In other words, there may be another reference block indicated by the second motion information symmetric with the first motion information around the position of the current block. This another reference block may be referred to as a second reference block or may be called an L1 reference block. The MV included in the first motion information and the MV included in the second motion information that is symmetric with the MV included in the first motion information may be called an MV pair. The first reference block and the second reference block may represent the same object. Thus, according to the above assumption, the first reference block and the second reference block may have the same sample value. Using this feature, the motion information of the current block may be derived. Specifically, for example, when a difference between a specific reference block among the reference blocks in the L1 direction and the reference block in the L0 direction, that is, the first reference block indicated by the MV is the smallest, the decoding device may derive the specific reference block as the second reference block. In this connection, the difference may be called cost. The cost may be derived as the sum of the absolute values of the differences between the corresponding samples to the first reference block and the second reference block. The decoding device may define MVL1 indicating the second reference block as the MV pair.

In one example, in this case, the first motion information may be derived based on motion information of one of neighboring blocks to the current block. For example, the motion information of the neighboring block with the highest priority based on the priorities according to the positions of the available neighboring blocks to the current block may be used as the first motion information of the current block. Alternatively, motion information of a neighboring block at a predefined position among the neighboring blocks to the current block may be used as the first motion information.

Further, the second motion information of the current block may be present. The second MV of the second motion information may be defined as the MV. For example, when a cost between a specific reference block among the reference blocks in the L0 direction and the reference block indicated by the MV is the smallest, the decoding device may derive the specific reference block as the first reference block. The decoding device may define MVL0 indicating the first reference block as the MV pair. In one example, in this case, the second motion information may be derived based on motion information of one of neighboring blocks to the current block. For example, the motion information of the neighboring block with the highest priority based on the priorities according to the positions of the available neighboring blocks to the current block may be used as the second motion information of the current block. Alternatively, motion information of a neighboring block at a predefined position among the neighboring blocks to the current block may be used as the second motion information.

In one example, the decoding device may not derive the first motion information or the second motion information directly using the motion information of neighboring blocks to the current block. In this case, the decoding device derives an arbitrary temporary first reference block based on a specific reference point on the reference picture of the first reference picture list. Then, the device may derive a temporary 2-1 reference block position-symmetric with the temporary 1-1 reference block on the reference picture of the second reference picture list based on the current block of the current picture. In this case, the decoding device may derive the first difference between the temporary 1-1 reference block and the temporary 2-1 reference block. In this case, the decoding device changes the position of the temporary first reference block in in a certain region based on the specific reference point and/or by certain times. The device derives the temporary 2-2 reference block position-symmetric to the temporary 1-2 reference block at the changed position. The device may derive a second difference between the temporary 1-2 reference block and the temporary 2-2 reference block. The decoding device repeats the above procedure in the certain region and/or by the certain times. The device may derive the 1-n temporary reference block and the second-n temporary reference block. Then, When a difference between the 1-n temporary reference block and the second-n temporary reference block is the smallest difference among the first difference to the n-th difference, the device may define the 1-n temporary reference block and the second-n temporary reference block as the first reference block and the second reference block, respectively. In this case, the decoding device may derive motion information indicating the first reference block as first motion information. In this connection, the specific reference point may be determined based on the position of the current block. In one example, the position in the reference picture on the first reference picture list indicated by the position of the current block may be used as the specific reference point. Alternatively, the position in the reference picture on the first reference picture list as indicated by the motion information of the neighboring block to the current block based on the position of the current block may be used as the specific reference point may be defined as the specific reference point.

The cost function for deriving the MV and the MV pair of the current block can be expressed as Equation as follows. That is, the cost may be derived based on Equation as follow $$Cost_{distortion} = \sum_{(i,j) \in BlockSize} |Block_{past}(i, j) - Block_{future}(i, j)| \quad \text{[Equation 1]}$$

In this connection, i, j represents the position (i, j) of the sample in the block. Cost$_{distortion}$ denotes the cost. Block$_{past}$ represents the sample value of the reference block indicated by the MV in L0 direction. Block$_{future}$ represents the sample value of the MV pair reference block in the L1 direction. In one example, FIG. 4 shows one example in which L0 motion information for the current block is present. The reference block indicated by the MV is represented by Block$_{past}$, and the reference block indicated by the MV pair may be represented by Block$_{future}$. When L1 motion information for the current block exists, the reference block indicated by the MV may be represented by Block$_{future}$, and the reference block indicated by the MV pair may be represented by Block$_{past}$. When the difference between the L0 direction reference block and the L1 direction reference block corresponding to the current block is the smallest, the decoding device may derive the reference block of the L0 direction and the reference block of the L1 direction as the first reference block and the second reference block respectively. The device may select L0 motion information indicating the first reference block and L1 motion information indicating the second reference block as motion information of the current block. This allows the decoding device to search the motion information of the current block without referring to the reconstructed sample of the current block. In one example, the POC (picture order count) difference between the reference picture including the first reference block and the current picture and the POC (picture order count) difference between the reference picture including the second reference block and the current picture are the same or different.

Figure 5:
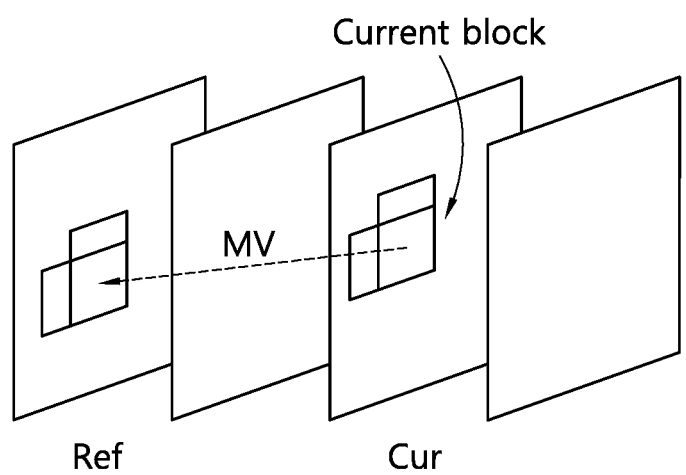
FIG. 5 shows an example of a method for deriving the motion information of the current block using the template matching method.

FIG. 5 shows an example of a method for deriving the motion information of the current block using the template matching method. The template matching method may represent a method of deriving motion information based on sample values of neighboring samples to the current block. The neighboring samples to the current block may include left neighboring samples and upper neighboring samples that may be referenced by the current block. Referring to FIG. 5, an arbitrary neighboring region to the current block may be set as a template of the current block. The motion information of the current block may be searched using the same template as the template of the current block on the reference picture. The left neighboring samples and the upper neighboring samples to the current block may be already decoded at the decoding time of the current block. Therefore, they may be used in the motion estimation process in the decoding device. Thus, the left neighboring samples and the upper neighboring samples may be included in the template of the current block. That is, the template of the current block may be a specific region including the left neighboring samples and the upper neighboring samples. Specifically, when a difference between a specific template among the templates of the blocks in the reference picture and the template of the current block is the smallest, the MV indicating the reference block of the specific template may be derived as the MV of the current block. In this connection, the difference may be called the cost. The cost may be derived as the sum of the absolute values of the differences between the corresponding samples to the first reference block and the second reference block. Further, the cost function for deriving the MV of the current block can be expressed as Equation as follows. That is, the cost may be derived based on Equation as follows.

$$Cost_{distortion} = \sum_{(i,j) \in TemplateSize} |Temp_{ref}(i,j) - Temp_{cur}(i,j)| \quad \text{[Equation 2]}$$

In this connection, i, j represents the position (i, j) of the sample in the block. Cost$_{distortion}$ represents the cost. Temp$_{ref}$ represents the sample value of the template of the reference block indicated by the MV in the reference picture. Temp$_{cur}$ represents the sample value of the template of the current block. The differences between the samples corresponding to the template of the reference block and the template of the current block may be accumulated. The accumulation of the differences may be used as a cost function to derive the MV of the current block.

In one example, when motion information of the current block is derived based on the above methods, weights for the motion information may be derived.

Figure 6:
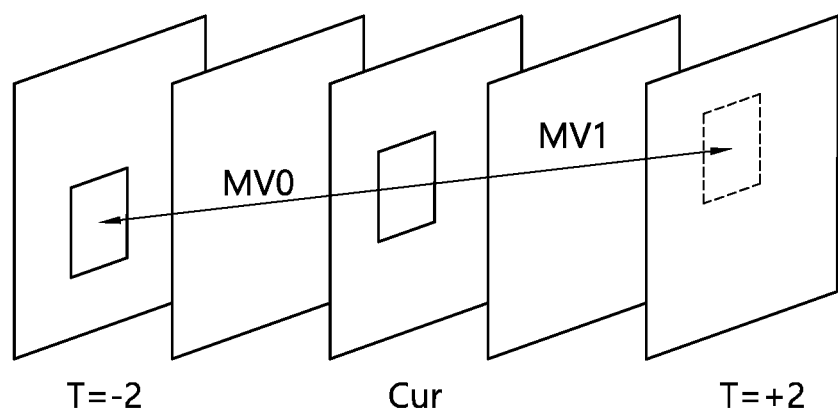
FIG. 6 is an illustration of one example of MVL0 and MVL1 of the current block derived from the Bi-lateral matching method.

FIG. 6 provides an example of one of the MVL0 and MVL1 of the current block derived from the Bi-lateral matching method. When the MVL0 and the MVL1 are derived based on the bi-lateral matching method, the first weight for the MVL0 and the second weight for the MVL1 may be derived. In this case, the first weight may be applied to the reference sample indicated by the MVL0, while the second weight may be applied to the reference sample indicated by the MVL1. That is, when the bi-prediction is applied to the current block, the decoding device may derive a first reference sample based on the L0 motion information, and derive the second reference sample based on the L1 motion information. A predicted sample of the current block may be generated by weighted-summing the first reference sample and the second reference sample based on the first weight and the second weight. When the bi-prediction is applied, the weighted-summing of the first reference sample and the second reference sample to generate the predicted sample may improve the accuracy of the bi-prediction. The decoding device may generate the predicted sample by weighted-summing the first reference sample and the second reference sample using the same weight. That is, the decoding device may generate the predicted sample by summing the sample value of the first reference sample and the sample value of the second reference sample and by dividing the summing result by 2. This may correspond to a case where the weight of each of the first reference sample and the second reference sample is ½. In this case, the predicted sample may be derived based on Equation as follows.

$$Block_{pred}(i,j) = (Block_{cor0}(i,j) + Block_{cor1}(i,j))/2 \quad \text{[Equation 3]}$$

In this connection, i, j represents the position (i, j) of the sample in the block. Block$_{pred}$ represents the predicted block of the current block. Block$_{cor0}$ represents the first reference block indicated by the MVL0. Block$_{cor1}$ represents the second reference block indicated by the MVL1.

In one example, according to the method presented in the present disclosure, the decoding device may generate a predicted sample in consideration of the weight of each of the derived L0 motion information and the L1 motion information. That is, when the MVL0 and the MVL1 are derived based on the Bi-lateral matching method as shown in FIG. 6, t predicted block containing the predicted sample may be derived based on Equation as follows $$Block_{pred}(i,j) = w \times Block_{cor0}(i,j) + (1-w) \times Block_{cor1}(i,j), \\ 0 < W < 1 \quad \text{[Equation 4]}$$

In this connection, i, j represents the position (i, j) of the sample in the block, Block$_{pred}$ represents the predicted block of the current block, $block_{cor0}$ represents the first reference block indicated by the MVL0, $block_{cor1}$ represents the second reference block indicated by the MVL1, and w represents the first weight. In this case, the second weight may be expressed as a value (1−the first weight), that is, (1−w). The bi-prediction method for deriving the predicted sample by applying a weight to each of the L0 motion information and the L1 motion information may improve the prediction accuracy as compared with the bi-prediction method shown in Equation 3 above.

The L0 motion information and L1 motion information derived based on the bi-lateral matching method can be derived not only by an encoding device but also by a decoding device. Thus, in estimating the L0 motion information and L1 motion information, the reconstructed sample value of the current block may not be used. Similarly, when the decoding device derives the weights for the bi-prediction, the sample value of the reconstructed sample of the current block may not be used. In one example, information about the weights may be encoded and signaled separately. In this case, the decoding device may obtain the weights for the bi-prediction based on information about the received weights. A method by which the decoding device derives weights without reception of signaling of information about the weights, or a method in which the device receives the information about the weights and derives the weights is as follows.

First, a method of deriving the weights when the information about the weights for the bi-prediction is not signaled may include a method of deriving the weights based on a cost function to estimate the motion information, and a method of deriving the weights without using the estimation of the motion information.

In one example, the weights may be derived based on the Equation 1, which represents the cost function of the Bi-lateral matching method. That is, the difference between the samples corresponding to the first reference block and the second reference block derived based on the MV and MV pair may be used to derive the weights for the bi-prediction. For example, a plurality of first weight candidate and second weight candidate combinations may be applied to the first reference block and the second reference block, resulting in a plurality of costs. Then, the first and second weight candidates associated with the smallest cost of the plurality of costs may be derived as the first weight and the second weight, respectively. In this connection, the cost may be defined as the sum of the absolute values of the differences between the samples corresponding to the first reference block to which the first weight is applied and the second reference block to which the second weight is applied. The cost function to derive the first weight and the second weight may be expressed as Equation as follows. That is, the cost may be derived based on Equation as follows.

$$Cost_{distortion} = \sum_{(i,j) \in BlockSize} |w \times Block_{past}(i, j) - (1 - w) \times Block_{future}(i, j)|$$

[Equation 5]

In this connection, i, j represents the position (i, j) of the sample in the block, $Cost_{distortion}$ represents the cost, $Block_{past}$ represents the sample value of the reference block indicated by the MV in L0 direction, $Block_{future}$ represents the sample value of the reference block indicated by the MV pair in the L1 direction, and w represents the first weight. In this case, the second weight may be expressed as a value from 1 minus the first weight, that is, (1−w). The difference between Equation 5 and Equation 1 is that the first weight w is reflected to the equation. The terms except the first weight w may have the same physical meaning among between Equation 5 and Equation 1. In this case, the first weight and the second weight may be derived based on Equation 5. Specifically, the sample value of the reference block indicated by the MV and the sample value of the reference block indicated by the MV pair are already deduced values. Only the first weight may be input as a variable. A value of 0 or greater and 1 or smaller when the cost is smallest may be derived as the first weight. The above-described method may have the advantage that the value of the weight may be more flexible selected in a range of 0 to 1 inclusive, compared with the method of deriving the first weight candidate and the second weight candidate constituting a combination selected based on the received index information among a specific number of the first weight candidate and the second weight candidate combinations, as the first weight and the second weight of the current block.

In another example, the Equation 2 representing the cost function of the template matching method may be applied to the L0 motion information and L1 motion information derived based on the bi-lateral matching method to derive the weights.

Figure 7:
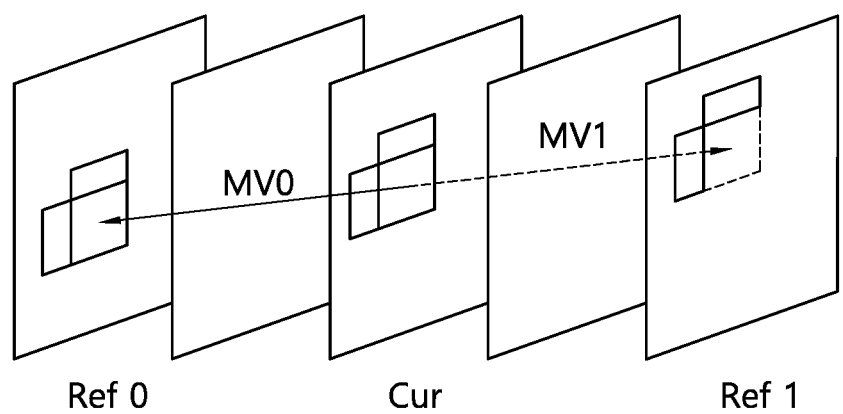
FIG. 7 shows an example of a method for deriving the weights by performing the template matching method based on the MV-MV pair derived from the Bi-lateral matching method.

FIG. 7 shows an example of a method for deriving the weights by performing the template matching method based on the derived MV and MV pairs based on the bi-lateral matching method. Specifically, for example, the MV and the MV pair of the current block may be derived based on Equation 1 described above. The template of the current block, and the template of the reference block indicated by the MV corresponding to the template of the current block, and the template of the reference block indicated by the MV pair may be derived. The current block template may include left neighboring samples and upper neighboring samples to the current block. That is, the template of the current block may be a specific region including left neighboring samples to the current block and the upper neighboring samples to the current block. The template of the reference block indicated by the MV may include left neighboring samples and upper neighboring samples to the reference block. The template of the reference block indicated by the MV pair may include left neighboring samples and upper neighboring samples to the reference block. The template of the reference block indicated by the MV may be a specific region including the left neighboring samples to the reference block and the upper neighboring samples thereto. The template of the reference block indicated by the MV pair may be a specific region including the left neighboring samples to the reference block and the upper neighboring samples thereto. In this case, the device may weighted-sum the samples corresponding to the template of the reference block and the template of the reference block as indicated by the MV pair. The cost as the difference between the sample value of the template of the current block and the weighted-summed value may be used to derive the weights for the bi-prediction. For example, the first and second weight candidate combinations may be applied to the template of the reference block indicated by the MV and the template of the reference block indicated by the MV pair, resulting in a plurality of weighted-summed templates. A plurality of costs between the plurality of weighted-summed templates of reference blocks and the template of the current block may be derived. Then, the first weight candidate and the second weight candidate associated with the smallest cost of the plurality of costs may be derived as the first weight and the second weight, respectively. The cost function to derive the first weight and the second weight may be expressed as Equation as follows. That is, the cost may be derived based on Equation as follows.

$$Cost_{distortion} = \sum_{(i,j) \in TemplateSize} |Temp_{cur}(i, j) - (w \times Temp_{ref0}(i, j) + (1 - w) \times Temp_{ref1}(i, j))|$$ [Equation 6]

In this connection, i, j represents the position (i, j) of the sample in the block, $Cost_{distortion}$ represents the cost, $Temp_{cur}$ represents the sample value of the template of the current block, $Temp_{ref0}$ represents the sample value of the template of the reference block indicated by the MV, $Temp_{ref1}$ represents the sample value of the template of the reference block indicated by the MV pair, and w represents the first weight. In this case, the second weight may be expressed as a value minus the first weight from 1, that is, (1−w). The decoding device may derive L0 motion information and L1 motion information of the current block by applying the Bi-lateral matching method based on the Equation 1. Next, the device may derive the weights for the bi-prediction based on the Equation 6. Further, the decoding device may derive all of the L0 motion information and the L1 motion information and the weights about the current block based on the Equation 6.

In one example, the weights for the bi-prediction are obtained by the decoding device using a separate method that is independent of the method using the cost function for estimation of the motion information, for example, and the cost function of the bi-lateral matching method.

In one example, a method of deriving the weights using the separate method may include a method of deriving the weights based on a picture order count (POC) difference between a reference picture and a current picture.

FIG. 8 shows one example of a method for deriving the weights based on the POC difference between the reference picture and the current picture. When the POC difference between the first reference picture included in L0 and the current picture is equal to the POC difference between the second reference picture included in L1 and the current picture, as shown in FIG. 8 (a), the first weight for the L0 and the second weight for the L1 may be set to be equal and thus as ½. Further, as shown in FIG. 8 (b), when the POC difference between the first reference picture and the current picture is not equal to the POC difference between the second reference picture and the current picture, the ratio between the first weight and the second weight may be configured to be in inverse proportion to a ratio between the POC differences. That is, the first weight and the second weight may be configured such that the ratio between the first weight and the second weight may be configured to be in inverse proportion to a ratio between the POC difference between the first reference picture and the current picture and the POC difference between the second reference picture and the current picture. To be specific, the POC difference between the first reference picture and the current picture may be 2. The POC difference between the second reference picture and the current picture may be 1. In this case, the ratio between the POC difference between the first reference picture and the current picture and the POC difference between the second reference picture and the current picture may be derived as 2:1. Therefore, the first weight may be derived as ⅓ and the second weight as ⅔ such that the ratio between the first weight and the second weight is inversely proportional to the ratio of 2:1.

In another example, the bi-lateral matching method derives motion information including the MV pair corresponding to the MV based on the MV. Thus, a high weight may be derived for the reference block in the reference picture associated with the MV. For example, the MV shown in FIG. 8 may be represented as a motion vector in L0 direction, that is, as MVL0 included in L0 motion information. Therefore, the first weight for the L0 reference block may be derived as a high value. The second weight for the L1 reference block may be derived as a low value.

In one example, the encoding device may derive the weights for the bi-prediction based on the reconstructed sample information of the current block and encode and signal the information about the weights. In this case, the decoding device may derive the weights based on signaled information about the weights without a separate process to derive the weights. A cost function for deriving the weights for the bi-prediction based on information about the reconstructed sample of the current block by the encoding device may be expressed as Equation as follows.

$$Cost_{distortion} = \sum_{(i,j) \in BlockSize} |Block_{cur}(i, j) - (w \times Block_{ref0}(i, j) + (1 - w) \times Block_{ref1}(i, j))|$$ [Equation 7]

In this connection, i, j represents the position (i, j) of the sample in the block. $Cost_{distortion}$ represents the cost between the current block and the weighted-summed value between the first reference block and the second reference block. $Block_{cur}$ represents the current block, $block_{cor0}$ represents the first reference block indicated by the MVL0, $block_{cor1}$ represents the second reference block indicated by the MVL1, and w represents the first weight. In this case, the second weight may be expressed as (1−the first weight), that is, (1−w). The encoding device may derive the first weight and the second weight based on the Equation 7, and may also signal information about the first weight and the second weight. In this case, the decoding device may receive an index indicating one combination of the predetermined number of the first weight candidate and second weight candidate combinations. The index may be included in the information about the first weight and the second weight. The specific number of the first weight candidate and second weight candidate combinations may be derived as shown in the following table.

TABLE 1

| Index | First weight candidate and second weight candidate |
|---|---|
| 0 | 1/8, 7/8 |
| 1 | 2/8, 6/8 |
| 2 | 3/8, 5/8 |
| 3 | 1/2, 1/2 |
| 4 | 5/8, 3/8 |
| 5 | 6/8, 2/8 |
| 6 | 7/8, 1/8 |

The first weight candidate in the first weight candidate and second weight candidate combination indicated by the index may be derived as the first weight. The second weight candidate in the combination indicated by the index may be derived as the second weight. Further, a flag may be signaled to indicate whether the motion compensation is applied using the weights for bi-prediction, that is, whether or not the bi-prediction is performed using the weights. When the flag indicates that bi-prediction using the weight is performed, a syntax may be structured such that the index indicating one of the first weight candidate and second weight candidate combinations may be signaled. That is, a flag indicating whether the bi-prediction using the weight is performed may be signaled. The index indicating one combination of the first weight candidate and second weight candidate combinations may be signaled.

In one example, when the motion information of the current block is derived based on the template matching method, the weight for each of the L0 direction and L1 direction may be applied as follows when the bi-prediction is performed. The method for deriving the weights for the bi-prediction, i.e., the first weight for L0 motion information and the second weight for L1 motion information when the motion information of the current block is derived based on the template matching method may be similar to the method of deriving the weights when the motion information of the current block is derived based on the bi-lateral matching method as described above. In other words, the method of deriving the weights when the motion information of the current block is derived based on the template matching method may include a method of deriving the weights by the decoding side when information about the weights is signaled, and a method for deriving the weights by the decoding side without the signaling.

For example, when the information about the first weight and the second weight is signaled, the decoding device may receive an index indicating one of a predetermined number of the first weight candidate and second weight candidate combinations. The index may be included in the information about the first weight and the second weight. The first weight candidate of the first weight candidate and second weight candidate combination as indicated by the index may be derived as the first weight, and the second weight candidate of the combination indicated by the index may be derived as the second weight.

Further, without signaling the information about the first weight and the second weight, the first weight and the second weight may be derived.

Figure 9:
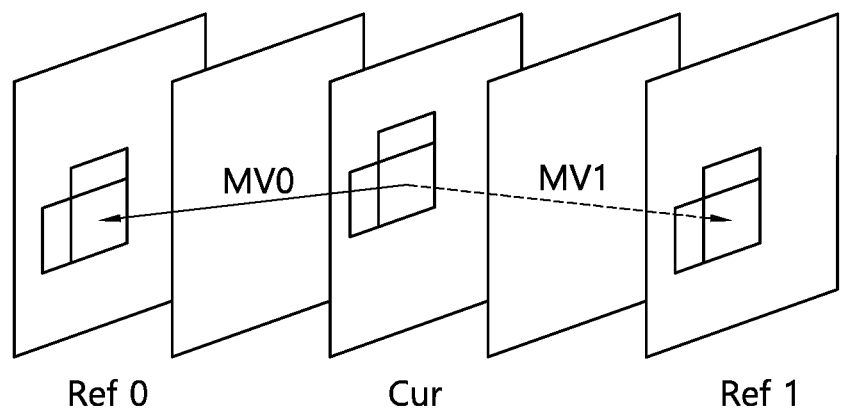
FIG. 9 illustrates one example of a method for deriving the weights based on the template matching method.

FIG. 9 illustrates one example of a method for deriving the weights based on the template matching method. The method for deriving the weights based on the template matching method may be similar to the method for deriving the weights based on Equation 6 above. However, the method of deriving the weights based on Equation 6 as described above derives the L0 motion information and L1 motion information of the current block by employing the bi-lateral matching method. In addition to deriving the L0 motion information and the L1 motion information, the weights may be derived by applying the L0 motion information and the L1 motion information derived based on the Equation 6. However, when applying the method of deriving the weights based on the template matching method, all of the L0 motion information and L1 motion information of the current block and the weights thereof may be derived.

Specifically, for example, a template of the current block may be derived. Further, the templates of the L0 reference block candidates in the reference picture included in L0 corresponding to the template of the current block, and the templates of L1 reference block candidates in the reference picture included in L1 may be derived. The template of the current block may include left neighboring samples and upper neighboring samples to the current block. The templates of the L0 reference block candidates may include left neighboring samples and upper neighboring samples to each reference block candidate. The templates of the L1 reference block candidates may include left neighboring samples and upper neighboring samples to each reference block candidate. In this case, sample values corresponding to a single template among the templates of the L0 reference block candidates and a single template among the templates of the L0 reference block candidates may be weighted-summed together. In other words, a weighted-summed template may be derived by weighted summing a single template among the templates of the L0 reference block candidates and a single template among the templates of the L1 reference block candidates. This procedure is repeated for templates of the L0 reference block candidates and templates of the L1 reference block candidates. Thus, a plurality of weighted-summed templates may be derived. The cost as the difference between the corresponding samples to the template of the current block and the weighted-summed template may be used to derive the L0 motion information, L1 motion information, and the weights. For example, the templates of the plurality of L0 reference block candidates and the templates of the plurality of the L1 reference block candidates corresponding to the template of the current block may be derived. A plurality of weighted-summed templates may be derived based on the templates of the plurality of the L0 reference block candidates and the templates of the plurality of the L1 reference block candidates, and a plurality of first weight candidates an second weight candidate combinations. Next, the cost between the template of the current block and each of the plurality of weighted-summed templates may be derived. Then, the L0 reference block candidate, the L1 reference block candidate, the first weight candidate, and the second weight candidate associated with the smallest cost of the costs may be derived as the L0 reference block, the L1 reference block, the first weight and the second weight respectively. Then, the motion information indicating the L0 reference block may be derived as the L0 motion information. Motion information indicating the L1 reference block may be derived as the L1 motion information. The cost function to derive the L0 motion information, L1 motion information, the first weight and the second weight may be expressed as Equation as follows. That is, the residual may be derived based on Equation as follows.

$$Cost_{distortion} = \sum_{(i,j) \in TemplateSize} |Temp_{cur}(i, j) - \quad \text{[Equation 8]}$$
$$(w \times Temp_{ref0}(i, j) + (1 - w) \times Temp_{ref1}(i, j))|$$

In this connection, i, j represents the position (i, j) of the sample in the block. $Temp_{cur}$ represents the sample value of the template of the current block, $temp_{ref0}$ represents the sample value of the template of the L0 reference block candidate, $temp_{ref1}$ represents the sample value of the template of the L1 reference block candidate, and w represents the first weight. In this case, the second weight may be expressed as a value of (1−the first weight), that is, (1−w).

Further, one example of a method for deriving the first weight and the second weight other than the method that uses the cost function of the Equation 8 may include a method of deriving a weight to be inversely proportional to the POC difference. That is, the first weight and the second weight may be configured such that the ratio between the first weight and the second weight may be configured to be in inverse proportion to a ratio between the POC difference between the first reference picture included in L0 and the current picture and the POC difference between the second reference picture included in L1 and the current picture. To be specific, the POC difference between the first reference picture and the current picture may be 2. The POC difference between the second reference picture and the current picture may be 1. In this case, the ratio between the POC difference between the first reference picture and the current picture and the POC difference between the second reference picture and the current picture may be derived as 2:1. Therefore, the first weight may be derived as ⅓ and the second weight as ⅔ such that the ratio between the first weight and the second weight is inversely proportional to the ratio of 2:1.

Figure 10:
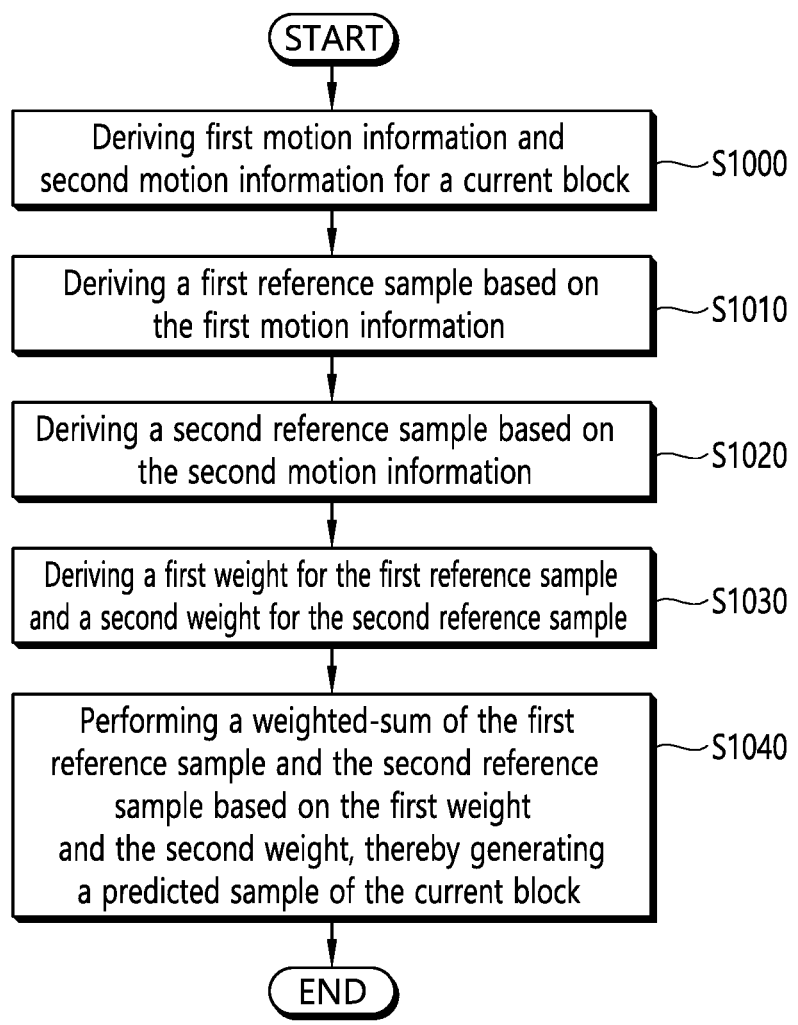
FIG. 10 outlines the video encoding method by the encoding device according to the present disclosure.

FIG. 10 outlines the video encoding method by encoding device according to the present disclosure. The method described in FIG. 10 can also be performed by the encoding device described in FIG. 1. Specifically, for example, S1000 to S1040 in FIG. 10 may be performed by the predicting module of the encoding device.

The encoding device derives first motion information and second motion information of the current block (S1000). When the encoding device applies bi-prediction to the current block, the first motion information and the second motion information of the current block may be derived. In this connection, the first motion information may include at least one of a first reference picture index and a first motion vector (Motion Vector, MV) included in the first reference picture list for the current block, while the second motion information may include at least one of the second reference picture index and second MV included in the second reference picture list for the current block. In this connection, the first direction may be called L0 direction, or past direction, or forward direction. Further, the second direction may be referred to as the L1 direction, or future direction, or reverse direction. Further, the first motion information may be referred to as L0 motion information, while the second motion information may also be referred to as L1 motion information. Further, the first MV may be called MVL0 while the second MV may be called MVL1. Further, the first reference picture list may be referred to as a reference picture list L0 (List 0, L0) while the second reference picture list may be referred to as a reference picture list L1 (List 1, L1). Further, the first reference picture index may indicate the first reference picture on the first reference picture list, while the second reference picture may indicate the second reference picture on the second reference picture list. The first reference picture list may include previous pictures to the current picture in the output order. The second reference picture list may include subsequent pictures to the current picture in the output order.

In one example of deriving the first motion information and the second motion information, the encoding device may derive the first motion information and the second motion information of the current block based on a bi-lateral matching method. Specifically, the encoding device may derive the first motion information indicating the first reference block using motion estimation. Then, when the cost between a specific reference block among the reference blocks included in the reference pictures included in the second reference picture list and the first reference block is smallest, the encoding device may derive the specific reference block as a second reference block. The encoding device may derive motion information indicating the second reference block as the second motion information. The cost may be expressed as the sum of absolute differences (SAD) of the differences between the samples corresponding to the first reference block and the second reference block. Further, the cost may be derived based on Equation 1 above. That is, the second motion information may be derived based on Equation 1 described above.

Further, the encoding device may derive the second motion information indicating the second reference block using motion estimation. Then, when the cost between a specific reference block among the reference blocks included in the reference pictures included in the first reference picture list and the second reference block is smallest, the encoding device may derive the specific reference block as a first reference block. The encoding device may derive motion information indicating the first reference block as the first motion information. The cost may be expressed as the sum of absolute differences (SAD) of the differences between the samples corresponding to the first reference block and the second reference block. Further, the cost may be derived based on Equation 1 above. That is, the first motion information may be derived based on Equation 1 described above.

In one example, the first motion information or the second motion information may not be derived based on the motion estimation. In this case, the encoding device derives an arbitrary temporary first reference block based on a specific reference point on the reference picture of the first reference picture list. Then, the device may derive a temporary 2-1 reference block position-symmetric with the temporary 1-1 reference block on the reference picture of the second reference picture list based on the current block of the current picture. In this case, the encoding device may derive the first difference between the temporary 1-1 reference block and the temporary 2-1 reference block. In this case, the encoding device changes the position of the temporary first reference block in a certain region based on the specific reference point and/or by certain times. The device derives the temporary 2-2 reference block position-symmetric to the temporary 1-2 reference block at the changed position. The device may derive a second difference between the temporary 1-2 reference block and the temporary 2-2 reference block. The encoding device repeats the above procedure in the certain region and/or by the certain times. The device may derive the 1-n temporary reference block and the second-n temporary reference block. Then, When a difference between the 1-n temporary reference block and the second-n temporary reference block is the smallest difference among the first difference to the n-th difference, the device may define the 1-n temporary reference block and the second-n temporary reference block as the first reference block and the second reference block, respectively. In this case, the encoding device may derive motion information indicating the first reference block as first motion information. In this connection, the specific reference point may be determined based on the position of the current block. In one example, the position in the reference picture on the first reference picture list indicated by the position of the current block may be used as the specific reference point. Alternatively, the position in the reference picture on the first reference picture list as indicated by the motion information of the neighboring block to the current block based on the position of the current block may be used as the specific reference point may be defined as the specific reference point.

In another example, the encoding device may derive the first motion information and the second motion information of the current block using a template matching method.

Specifically, in deriving the first motion information of the current block, a template of the current block may be derived based on neighboring blocks to the current block. For example, the template may include left neighboring samples and upper neighboring samples to the current block. The template may be a specific region that includes left neighboring samples and upper neighboring samples to the current block. Next, when the cost between the template of the specific reference block among the reference blocks in the reference pictures included in the first reference picture list and the template of the current block is the smallest, the encoding device may derive the specific reference block as the first reference block. In this connection, the template of the reference block may include left neighboring samples and upper neighboring samples to the reference block. The template may be a specific region that includes left neighboring samples and upper neighboring samples to the current block. Motion information indicating the first reference block may be derived as the first motion information. Further, in deriving the second motion information of the current block, a template of the current block may be derived based on neighboring blocks to the current block. For example, the template may include left neighboring samples and upper neighboring samples to the current block. The template may be a specific region that includes left neighboring samples and upper neighboring samples to the current block. Next, when the cost between the template of the specific reference block among the reference blocks in the reference pictures included in the second reference picture list and the template of the current block is the smallest, the encoding device may derive the specific reference block as the second reference block. In this connection, the template of the reference block may include left neighboring samples and upper neighboring samples to the reference block. The template may be a specific region that includes left neighboring samples and upper neighboring samples to the current block. Motion information indicating the second reference block may be derived as the second motion information. The cost may be expressed as the sum of absolute differences (SAD) of the differences between the samples corresponding to the templates. Further, the cost may be derived based on Equation 2 above. That is, the first motion information or the second motion information may be derived based on Equation 2 described above.

The encoding device derives a first reference sample based on the first motion information (S1010). The encoding device may derive a first reference sample based on the first motion information. Specifically, the encoding device may derive the first reference block in the first reference picture as indicated by the first MV. The first reference block may include the first reference sample.

The encoding device derives a second reference sample based on the second motion information (S1020). The encoding device may derive a second reference sample based on the second motion information. Specifically, the encoding device may derive a second reference block in the second reference picture as indicated by the second MV. The second reference block may include the second reference sample.

The encoding device derives the first weight for the first reference sample and the second weight for the second reference sample (S1030). The encoding device may derive the first weight and the second weight.

In one example, the encoding device may apply a plurality of first weight candidate and second weight candidate combinations to a first reference block and a second reference block to derive a plurality of costs. The device may derive the first weight candidate and the second weight candidate associated with the smallest cost of the plurality of costs, respectively, as the first weight and the second weight. The cost may be expressed as the SAD between the corresponding samples to the first reference block and the second reference block. Further, the cost may be derived based on Equation 5 above. That is, the first weight and the second weight may be derived based on Equation 5 described above. In this case, the first weight and the second weight may be values between 0 and 1. The sum of the first weight and the second weight may be one. Further, the first weight candidate may be one of values between 0 and 1, while the second weight candidate may be one of values between 0 and 1. Further, the first weight candidate and the second weight candidate may be the values included in the preset first weight candidate and the second weight candidate combination.

In another example, the encoding device may derive a template for the current block based on neighboring samples to the current block. The encoding device may also derive the template of the first reference block and the template of the second reference block that corresponds to the template of the current block. The current block template may include left neighboring samples and upper neighboring samples to the current block. The template of the first reference block may include left neighboring samples and upper neighboring samples to the first reference block. The template of the second reference block may include left neighboring samples and upper neighboring samples to the second reference block. In this case, the encoding device weighted-sums the template of the first reference block and the template of the second reference block based on a plurality of first weight candidate and second weight candidate combinations to generate a plurality of weighted-summed templates. The device may derive the cost between the current block template and each of the plurality of weighted-summed templates. The first and second weight candidates associated with the smallest cost among the costs may be derived as the first weight and the second weight, respectively. In this connection, the weighted-summed template may be derived as the sum between the sample corresponding to the template of the first reference block having the first weight candidate applied thereto and the sample corresponding to the template of the second reference block having the second weight candidate applied thereto. Further, the cost may be expressed as the SAD between the corresponding samples to the current block template and the weighted-summed template. Further, the cost may be derived based on Equation 6 above. That is, the first weight and the second weight may be derived based on Equation 6 above.

In one example, the encoding device may derive the first motion information, the second motion information, the first weight, and the second weight of the current block based on the template matching method. For example, the encoding device can derive a template of a current block based on neighboring samples to the current block. Then, the device may also derive the plurality of the templates of the first and second reference block candidates, corresponding to the template of the current block. Next, the encoding device derives a plurality of weighted-summed templates based on the plurality of templates of the first reference block candidates, a plurality of the second reference block candidates, and a plurality of first weight candidate and second weight candidate combinations. Then, the device may derive the cost between each of the plurality of weighted-summed templates and the template of the current block. The encoding device may define the first reference block candidate, the second reference block candidate, the first weight candidate and the second weight candidate associated with the smallest cost of the costs as the first reference block, the second reference block, the first weight and the second weight respectively. The device may derive motion information indicating the first reference block as the first motion information. The device may derive motion information indicating the second reference block as the second motion information.

As another example, the encoding device may derive a first difference between the picture order count (POC) between the current picture including the current block and the POC of the first reference picture, and a second difference between the POC of the current picture and the POC of the second reference picture. That is, the first weight and the second weight may be configured such that the ratio between the first weight and the second weight may be configured to be in inverse proportion to a ratio between the POC difference between the first reference picture and the current picture and the POC difference between the second reference picture and the current picture. To be specific, the POC difference between the first reference picture and the current picture may be 2. The POC difference between the second reference picture and the current picture may be 1. In this case, the ratio between the POC difference between the first reference picture and the current picture and the POC difference between the second reference picture and the current picture may be derived as 2:1. Therefore, the first weight may be derived as 1/3 and the second weight as 2/3 such that the ratio between the first weight and the second weight is inversely proportional to the ratio of 2:1.

In another example, when the first motion information is derived using motion estimation, and the second motion information is derived based on the first motion information, the encoding device may derive the first weight and the second weight so that the first weight has a value greater than the second weight. Further, when the second motion information is derived using motion estimation, and the first motion information is derived based on the second motion information, the encoding device may derive the first weight and the second weight so that the second weight has a value greater than the first weight.

The encoding device generates a predicted sample of the current block by weighted-summing the first reference sample and the second reference sample based on the first weight and the second weight (S1040). The encoding device may apply the first weight to the first reference sample. The device may apply the second weight to the second reference sample. Next, the encoding device may generate the predicted sample by summing the first reference sample with the first weight applied thereto and the second reference sample with the second weight applied thereto.

In one example, although not shown in the drawing, the encoding device may encode and output information about the prediction. For example, the encoding device may generate information about the first weight and the second weight and output information about the first weight and the second weight. Information about the first weight and the second weight may include an index indicating one of the first weight candidate and second weight candidate combinations.

Further, the encoding device may generate a residual sample based on the original sample and the derived predicted sample. The encoding device may generate information about the residual based on the residual sample. Information about the residual may include the transformation coefficient for the residual sample. The encoding device may derive the reconstructed sample based on the predicted sample and the residual sample. That is, the encoding device may derive the reconstructed sample by summing the predicted sample and the residual sample. Further, the encoding device may encode information about the residual and output it in the form of a bit stream. The bitstream may be transmitted to the decoding device using a network or storage medium.

Figure 11:
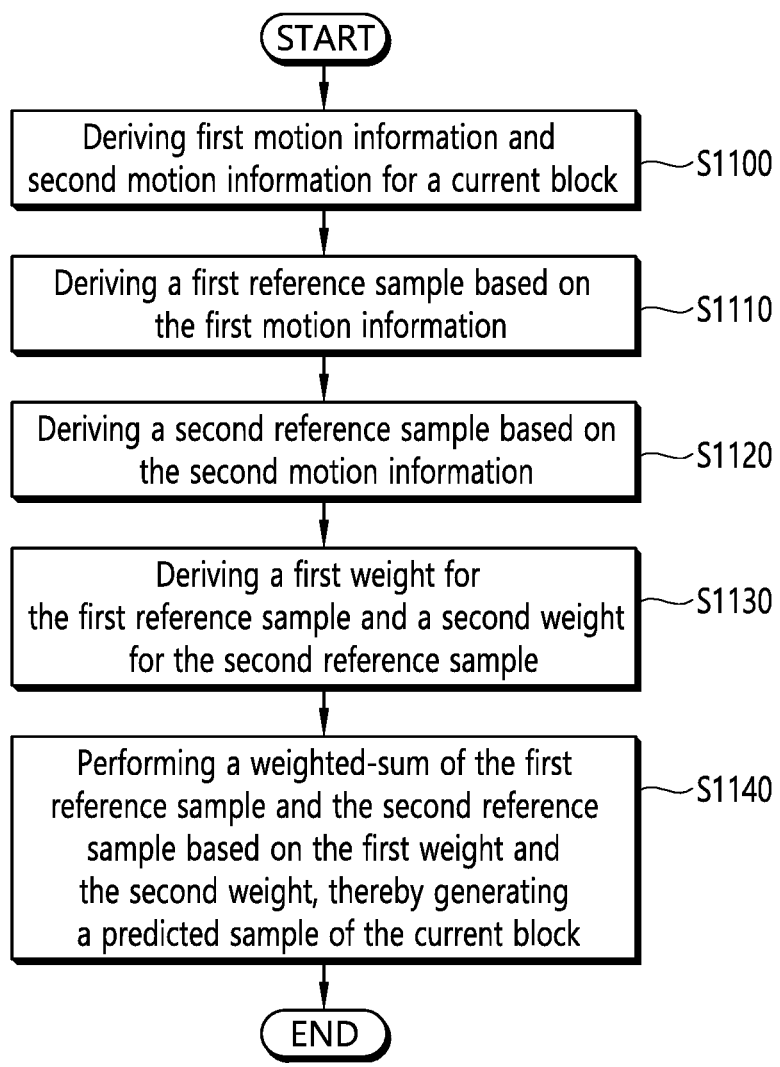
FIG. 11 outlines the video decoding method by the decoding device according to the present disclosure.

FIG. 11 outlines the video decoding method by the decoding device according to the present disclosure. The method described in FIG. 11 may be performed by the decoding device described in FIG. 2. Specifically, for example, S1100 to S1140 may be performed by a prediction module of the decoding device.

The decoding device derives first motion information and second motion information of the current block (S1100). When the decoding device applies bi-prediction to the current block, the first motion information and the second motion information of the current block may be derived. In this connection, the first motion information may include at least one of a first reference picture index and a first motion vector (Motion Vector, MV) included in the first reference picture list for the current block, while the second motion information may include at least one of the second reference picture index and second MV included in the second reference picture list for the current block. In this connection, the first direction may be called L0 direction, or past direction, or forward direction. Further, the second direction may be referred to as the L1 direction, or future direction, or reverse direction. Further, the first motion information may be referred to as L0 motion information, while the second motion information may also be referred to as L1 motion information. Further, the first MV may be called MVL0 while the second MV may be called MVL1. Further, the first reference picture list may be referred to as a reference picture list L0 (List 0, L0) while the second reference picture list may be referred to as a reference picture list L1 (List 1, L1). Further, the first reference picture index may indicate the first reference picture on the first reference picture list, while the second reference picture may indicate the second reference picture on the second reference picture list. The first reference picture list may include previous pictures to the current picture in the output order. The second reference picture list may include subsequent pictures to the current picture in the output order.

In one example of deriving the first motion information and the second motion information, the decoding device may derive the first motion information and the second motion information of the current block based on a bi-lateral matching method. Specifically, the decoding device may derive the first motion information indicating the first reference block using motion estimation. Then, when the cost between a specific reference block among the reference blocks included in the reference pictures included in the second reference picture list and the first reference block is smallest, the decoding device may derive the specific reference block as a second reference block. The decoding device may derive motion information indicating the second reference block as the second motion information. The cost may be expressed as the sum of absolute differences (SAD) of the differences between the samples corresponding to the first reference block and the second reference block. Further, the cost may be derived based on Equation 1 above. That is, the second motion information may be derived based on Equation 1 described above.

Further, the decoding device may derive the second motion information indicating the second reference block using motion estimation. Then, when the cost between a specific reference block among the reference blocks included in the reference pictures included in the first reference picture list and the second reference block is smallest, the decoding device may derive the specific reference block as a first reference block. The decoding device may derive motion information indicating the first reference block as the first motion information. The cost may be expressed as the sum of absolute differences (SAD) of the differences between the samples corresponding to the first reference block and the second reference block. Further, the cost may be derived based on Equation 1 above. That is, the first motion information may be derived based on Equation 1 described above.

In one example, the first motion information or the second motion information may not be derived based on the motion estimation. In this case, the decoding device derives an arbitrary temporary first reference block based on a specific reference point on the reference picture of the first reference picture list. Then, the device may derive a temporary 2-1 reference block position-symmetric with the temporary 1-1 reference block on the reference picture of the second reference picture list based on the current block of the current picture. In this case, the decoding device may derive the first difference between the temporary 1-1 reference block and the temporary 2-1 reference block. In this case, the decoding device changes the position of the temporary first reference block in a certain region based on the specific reference point and/or by certain times. The device derives the temporary 2-2 reference block position-symmetric to the temporary 1-2 reference block at the changed position. The device may derive a second difference between the temporary 1-2 reference block and the temporary 2-2 reference block. The decoding device repeats the above procedure in the certain region and/or by the certain times. The device may derive the 1-n temporary reference block and the second-n temporary reference block. Then, When a difference between the 1-n temporary reference block and the second-n temporary reference block is the smallest difference among the first difference to the n-th difference, the device may define the 1-n temporary reference block and the second-n temporary reference block as the first reference block and the second reference block, respectively. In this case, the decoding device may derive motion information indicating the first reference block as first motion information. In this connection, the specific reference point may be determined based on the position of the current block. In one example, the position in the reference picture on the first reference picture list indicated by the position of the current block may be used as the specific reference point. Alternatively, the position in the reference picture on the first reference picture list as indicated by the motion information of the neighboring block to the current block based on the position of the current block may be used as the specific reference point may be defined as the specific reference point.

In another example, the decoding device may derive the first motion information and the second motion information of the current block using a template matching method. Specifically, in deriving the first motion information of the current block, a template of the current block may be derived based on neighboring blocks to the current block. For example, the template may include left neighboring samples and upper neighboring samples to the current block. The template may be a specific region that includes left neighboring samples and upper neighboring samples to the current block. Next, when the cost between the template of the specific reference block among the reference blocks in the reference pictures included in the first reference picture list and the template of the current block is the smallest, the decoding device may derive the specific reference block as the first reference block. In this connection, the template of the reference block may include left neighboring samples and upper neighboring samples to the reference block. The template may be a specific region that includes left neighboring samples and upper neighboring samples to the current block. Motion information indicating the first reference block may be derived as the first motion information. Further, in deriving the second motion information of the current block, a template of the current block may be derived based on neighboring blocks to the current block. For example, the template may include left neighboring samples and upper neighboring samples to the current block. The template may be a specific region that includes left neighboring samples and upper neighboring samples to the current block. Next, when the cost between the template of the specific reference block among the reference blocks in the reference pictures included in the second reference picture list and the template of the current block is the smallest, the decoding device may derive the specific reference block as the second reference block. In this connection, the template of the reference block may include left neighboring samples and upper neighboring samples to the reference block. The template may be a specific region that includes left neighboring samples and upper neighboring samples to the current block. Motion information indicating the second reference block may be derived as the second motion information. The cost may be expressed as the sum of absolute differences (SAD) of the differences between the samples corresponding to the templates. Further, the cost may be derived based on Equation 2 above. That is, the first motion information or the second motion information may be derived based on Equation 2 described above.

The decoding device derives a first reference sample based on the first motion information (S1110). The decoding device may derive a first reference sample based on the first motion information. Specifically, the decoding device may derive the first reference block in the first reference picture as indicated by the first MV. The first reference block may include the first reference sample.

The decoding device derives a second reference sample based on the second motion information (S1120). The decoding device may derive a second reference sample based on the second motion information. Specifically, the decoding device may derive a second reference block in the second reference picture as indicated by the second MV. The second reference block may include the second reference sample.

The decoding device derives the first weight for the first reference sample and the second weight for the second reference sample (S1130). The decoding device may derive the first weight and the second weight.

In one example, the decoding device may apply a plurality of first weight candidate and second weight candidate combinations to a first reference block and a second reference block to derive a plurality of costs. The device may derive the first weight candidate and the second weight candidate associated with the smallest cost of the plurality of costs, respectively, as the first weight and the second weight. The cost may be expressed as the SAD between the corresponding samples to the first reference block and the second reference block. Further, the cost may be derived based on Equation 5 above. That is, the first weight and the second weight may be derived based on Equation 5 described above. In this case, the first weight and the second weight may be values between 0 and 1. The sum of the first weight and the second weight may be one. Further, the first weight candidate may be one of values between 0 and 1, while the second weight candidate may be one of values between 0 and 1. Further, the first weight candidate and the second weight candidate may be the values included in the preset first weight candidate and the second weight candidate combination.

In another example, the decoding device may derive a template for the current block based on neighboring samples to the current block. The decoding device may also derive the template of the first reference block and the template of the second reference block that corresponds to the template of the current block. The current block template may include left neighboring samples and upper neighboring samples to the current block. The template of the first reference block may include left neighboring samples and upper neighboring samples to the first reference block. The template of the second reference block may include left neighboring samples and upper neighboring samples to the second reference block. In this case, the decoding device weighted-sums the template of the first reference block and the template of the second reference block based on a plurality of first weight candidate and second weight candidate combinations to generate a plurality of weighted-summed templates. The device may derive the cost between the current block template and each of the plurality of weighted-summed templates. The first and second weight candidates associated with the smallest cost among the costs may be derived as the first weight and the second weight, respectively. In this connection, the weighted-summed template may be derived as the sum between the sample corresponding to the template of the first reference block having the first weight candidate applied thereto and the sample corresponding to the template of the second reference block having the second weight candidate applied thereto. Further, the cost may be expressed as the SAD between the corresponding samples to the current block template and the weighted-summed template. Further, the cost may be derived based on Equation 6 above. That is, the first weight and the second weight may be derived based on Equation 6 above.

In one example, the decoding device may derive the first motion information, the second motion information, the first weight, and the second weight of the current block based on the template matching method. For example, the decoding device can derive a template of a current block based on neighboring samples to the current block. Then, the device may also derive the plurality of the templates of the first and second reference block candidates, corresponding to the template of the current block. Next, the decoding device derives a plurality of weighted-summed templates based on the plurality of templates of the first reference block candidates, a plurality of the second reference block candidates, and a plurality of first weight candidate and second weight candidate combinations. Then, the device may derive the cost between each of the plurality of weighted-summed templates and the template of the current block. The decoding device may define the first reference block candidate, the second reference block candidate, the first weight candidate and the second weight candidate associated with the smallest cost of the costs as the first reference block, the second reference block, the first weight and the second weight respectively. The device may derive motion information indicating the first reference block as the first motion information. The device may derive motion information indicating the second reference block as the second motion information.

As another example, the decoding device may derive a first difference between the picture order count (POC) between the current picture including the current block and the POC of the first reference picture, and a second difference between the POC of the current picture and the POC of the second reference picture. That is, the first weight and the second weight may be configured such that the ratio between the first weight and the second weight may be configured to be in inverse proportion to a ratio between the POC difference between the first reference picture and the current picture and the POC difference between the second reference picture and the current picture. To be specific, the POC difference between the first reference picture and the current picture may be 2. The POC difference between the second reference picture and the current picture may be 1. In this case, the ratio between the POC difference between the first reference picture and the current picture and the POC difference between the second reference picture and the current picture may be derived as 2:1. Therefore, the first weight may be derived as ⅓ and the second weight as ⅔ such that the ratio between the first weight and the second weight is inversely proportional to the ratio of 2:1.

In another example, when the first motion information is derived using motion estimation, and the second motion information is derived based on the first motion information, the decoding device may derive the first weight and the second weight so that the first weight has a value greater than the second weight. Further, when the second motion information is derived using motion estimation, and the first motion information is derived based on the second motion information, the decoding device may derive the first weight and the second weight so that the second weight has a value greater than the first weight.

As another example, the decoding device may receive information about the first weight and the second weight over a bitstream. Then, the device may derive the first weight and the second weight based on the information. Information about the first weight and the second weight may include an index indicating one of the first weight candidate and second weight candidate combinations. In this case, the decoding device may generate the first weight candidate and second weight candidate combinations in a predefined manner. The first weight candidate in one combination indicated by the index may be derived as the first weight by the decoding device. The second weight candidate in the combination indicated by the index may be derived as the second weight by the decoding device.

The decoding device generates a predicted sample of the current block by weighted-summing the first reference sample and the second reference sample based on the first weight and the second weight (S1140). The decoding device may apply the first weight to the first reference sample. The device may apply the second weight to the second reference sample. Next, the decoding device may generate the predicted sample by summing the first reference sample with the first weight applied thereto and the second reference sample with the second weight applied thereto.

In one example, although not shown in the drawing, the decoding device may use the predicted sample as a reconstructed sample or may generate a reconstructed sample by adding a residual sample to the predicted sample, according to a prediction mode type. When there is a residual sample for the current block, the decoding device may receive information about the residual for the current block over the bitstream. Information about the residual may include transform coefficients for the residual sample. The decoding device may derive the residual sample (or residual sample array) for the current block based on the residual information. The decoding device may generate a reconstructed sample based on the predicted sample and the residual sample. A reconstructed block or reconstructed picture may be derived based on the reconstructed sample. Hereinafter, the decoding device may apply an in-loop filtering procedure such as deblocking filtering and/or SAO procedures to the reconstructed picture in order to improve the subjective/objective picture quality as needed.

According to the present disclosure, inter-prediction may be performed by applying respective weights to first motion information and second motion information about a current block. This may improve the prediction accuracy of the current block.

According to the present disclosure, the amount of additional information for the first motion information and the second motion information about the current block may be reduced. This may improve overall coding efficiency.

According to the present disclosure, the amount of additional information for weights for the first motion information and the second motion information about the current block may be reduced. This may improve overall coding efficiency.

In the above-described embodiments, methods are described based on a flowchart as a series of steps or blocks. However, the present disclosure is not limited to the order of steps s. Some steps may occur simultaneously or in a different order than the order of the steps described above. Further, those skilled in the art will appreciate that the step shown in the flowchart is not exclusive. It will be understood that other steps may be included or that one or more steps in the flowchart may be deleted without affecting the scope of the present disclosure.

The method according to the present disclosure described above may be implemented in software. The encoding device and/or decoding device according to the present disclosure may be included in a device that performs image processing, for example, for a TV, a computer, a smart phone, a set-top box, or a display device.

When the embodiments of the present disclosure are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

What is claimed is:

1. A video decoding method performed by a decoding device, the method comprising:
    deriving first motion information and second motion information for a current block;
    deriving a first reference block based on the first motion information;
    deriving a second reference block based on the second motion information;
    deriving a first weight for the first reference block and a second weight for the second reference block; and
    performing a weighted-sum of the first reference block and the second reference block based on the first weight and the second weight, thereby generating a predicted sample of the current block,
    wherein the first motion information includes a first reference picture index and a first motion vector (MV),
    wherein the second motion information includes a second reference picture index and a second MV,
    wherein a sum of the first weight and the second weight is 1,
    wherein deriving the first weight and the second weight includes applying a plurality of combinations of first weight candidates and second weight candidates to the first reference block and the second reference block to derive a plurality of costs; and
    deriving a first weight candidate and a second weight candidate of a combination corresponding to the smallest cost among the plurality of costs as the first weight and the second weight, respectively,
    wherein the cost is derived based on a following Equation:

$$Cost_{distortion} = \sum_{(i,j) \in BlockSize} |w \times Block_{past}(i,j) - (1-w) \times Block_{future}(i,j)|$$

where $Cost_{distortion}$ represents the cost, i, j represents a x component and y component of a sample in a block, $Block_{past}$ represents a sample value of the first reference block, $Block_{future}$ represents a sample value of the second reference block, w represents the first weight, and (1−w) represents the second weight.

2. The video decoding method of claim 1, wherein the first reference picture index indicates a first reference picture on a first reference picture list, wherein the second reference picture index indicates a second reference picture on a second reference picture list, wherein the first reference picture list includes previous pictures to the current picture in an output order,
    wherein the second reference picture list includes subsequent pictures to the current picture in the output order.

3. The video decoding method of claim 1, wherein deriving the first motion information and the second motion information of the current block includes:
    deriving the first motion information indicating the first reference block;
    deriving, as the second reference block, a specific reference block among reference blocks in reference pictures included in the second reference picture list, wherein a cost between the specific reference block and the first reference block is smallest; and
    deriving the motion information indicating the second reference block as the second motion information.

4. The video decoding method of claim 1, wherein deriving the first motion information of the current block includes:
    deriving a template of the current block based on neighboring samples to the current block; and
    deriving, as the first reference block, a specific reference block among reference blocks in reference pictures included in a first reference picture list, wherein a cost between a template of the specific reference block and the template of the current block is smallest; and
    deriving the motion information indicating the first reference block as the first motion information.

5. A video decoding device comprising:
a predictor configured to derive first motion information and second motion information for a current block, to derive a first reference block based on the first motion information, to derive a second reference block based on the second motion information, to derive a first weight for the first reference block and a second weight for the second reference block, and to perform a weighted-sum of the first reference block and the second reference block based on the first weight and the second weight, thereby generating a predicted sample of the current block; and
a memory configured to store a first reference picture including the first reference block and a second reference picture including the second reference block,
wherein the first motion information includes a first reference picture index and a first motion vector (MV),
wherein the second motion information includes a second reference picture index and a second MV,
wherein a sum of the first weight and the second weight is 1,
wherein deriving the first weight and the second weight includes applying a plurality of combinations of first weight candidates and second weight candidates to the first reference block and the second reference block to derive a plurality of costs; and
deriving a first weight candidate and a second weight candidate of a combination corresponding to the smallest cost among the plurality of costs as the first weight and the second weight, respectively,
wherein the cost is derived based on a following Equation:

$$\text{Cost}_{distortion} = \sum_{(i,j) \in BlockSize} |w \times \text{Block}_{past}(i, j) - (1 - w) \times \text{Block}_{future}(i, j)|$$

where $\text{Cost}_{distortion}$ represents the cost, i, j represents a x component and y component of a sample in a block, $\text{Block}_{past}$ represents a sample value of the first reference block, $\text{Block}_{future}$ represents a sample value of the second reference block, w represents the first weight, and (1−w) represents the second weight.

6. The video decoding device of claim 5, wherein the first reference picture index indicates the first reference picture on a first reference picture list, wherein the second reference picture index indicates the second reference picture on a second reference picture list, wherein the first reference picture list includes previous pictures to the current picture in an output order,
wherein the second reference picture list includes subsequent pictures to the current picture in the output order.

7. The video decoding device of claim 5, wherein the predictor derives the first motion information indicating the first reference block, derives, as the second reference block, a specific reference block among reference blocks in reference pictures included in the second reference picture list, wherein a cost between the specific reference block and the first reference block is smallest, and derives the motion information indicating the second reference block as the second motion information.

8. The video decoding device of claim 5, wherein the predictor derives a template of the current block based on neighboring samples to the current block, and derives, as the first reference block, a specific reference block among reference blocks in reference pictures included in a first reference picture list, wherein a cost between a template of the specific reference block and the template of the current block is smallest, and derives the motion information indicating the first reference block as the first motion information.

* * * * *